United States Patent
Sweeney et al.

(10) Patent No.: US 11,657,457 B2
(45) Date of Patent: May 23, 2023

(54) USER-MODIFIABLE INTERACTIVE DISPLAY OF PLACEMENT CHANNEL AND STATUS DATA

(71) Applicant: OnRisk, Inc., Princeton, NJ (US)

(72) Inventors: Francis Joseph Sweeney, Pennington, NJ (US); John Arthur Daves Kelley, Palo Alto, CA (US); Christopher Collins, Shoreview, MD (US)

(73) Assignee: OnRisk, Inc., Princeton, NJ (US)

( * ) Notice: Subject to any disclaimer, the term of this patent is extended or adjusted under 35 U.S.C. 154(b) by 0 days.

(21) Appl. No.: 16/824,249

(22) Filed: Mar. 19, 2020

(65) Prior Publication Data
US 2020/0219201 A1    Jul. 9, 2020

Related U.S. Application Data

(63) Continuation of application No. 15/005,876, filed on Jan. 25, 2016, now abandoned.

(51) Int. Cl.
G06Q 40/08    (2012.01)
(52) U.S. Cl.
CPC .................... *G06Q 40/08* (2013.01)
(58) Field of Classification Search
CPC ............... G06Q 40/08; G06Q 40/00
See application file for complete search history.

(56) References Cited

U.S. PATENT DOCUMENTS

| | | |
|---|---|---|
| 5,956,691 A | 9/1999 | Powers |
| 7,672,879 B1 | 3/2010 | Kumar et al. |
| 7,698,158 B1 | 4/2010 | Flagg |

(Continued)

FOREIGN PATENT DOCUMENTS

WO    2009105475 A1    8/2009

OTHER PUBLICATIONS

"Predictive Modeling for Life Insurance. Ways Life Insurers Can Participate in the Business Analytics Revolution." Deloitte Consulting. Apr. 2010. (Year: 2010).*

(Continued)

*Primary Examiner* — Elda G Milef
(74) *Attorney, Agent, or Firm* — Haynes Beffel & Wolfeld, LLP; Ernest J. Beffel, Jr.

(57) ABSTRACT

The technology disclosed provides systems and methods that display database objects representing entities, placement channels and workflow status in an insurance or other risk transfer program. Specially coded distribution trees and graphs of nodes represent the overall flow and, optionally, status of placement workflows. Node and edge data generated for display depicts multiple risk placements on behalf of at least one requesting party through intermediaries to responding parties. Line width of edges represents calculated relative size of placements, and pattern, style, and color of edges can depict statuses of the risk placements. Another geo-coded map display also depicts as nodes a requesting party, intermediaries and responding parties, connected by edges that represent communication channels. The disclosed technology includes transmitting the resulting node and edge data and the edge annotation data to a user device for display of an overall workflow status, enabling assessment of alternative placement strategies.

22 Claims, 12 Drawing Sheets

(56) References Cited

U.S. PATENT DOCUMENTS

| | | | |
|---|---|---|---|
| 8,666,788 | B1 | 3/2014 | Syed |
| 9,038,001 | B2 | 5/2015 | Jetter et al. |
| 9,100,430 | B1* | 8/2015 | Seiver ................. H04L 63/1433 |
| 9,154,372 | B2 | 10/2015 | Richmond et al. |
| 9,294,497 | B1* | 3/2016 | Ben-Or ............... H04L 63/1433 |
| 9,985,983 | B2 | 5/2018 | Seiver et al. |
| 2002/0194033 | A1 | 12/2002 | Huff |
| 2006/0004682 | A1* | 1/2006 | Danielson .............. G06Q 40/00 706/52 |
| 2007/0188494 | A1 | 8/2007 | Agutter et al. |
| 2012/0296694 | A1* | 11/2012 | McGill .................. G06Q 40/08 705/7.28 |
| 2012/0296695 | A1* | 11/2012 | McGill .................. G06Q 40/08 705/7.28 |
| 2013/0110560 | A1 | 5/2013 | Syed et al. |
| 2013/0117654 | A1 | 5/2013 | Rosner |
| 2014/0172465 | A1 | 6/2014 | Yoder |
| 2014/0304194 | A1 | 10/2014 | Hueler |
| 2014/0380205 | A1 | 12/2014 | Burckhardt et al. |
| 2015/0378979 | A1 | 12/2015 | Hirzel et al. |
| 2016/0191532 | A1* | 6/2016 | Seiver ................... H04L 63/101 726/4 |

OTHER PUBLICATIONS

"Predictive Modeling: Is It a Game Changer." RGA. https://www.rgare.com/knowledge-center/media/articles/predictive-modeling-is-it-a-game-changer; Sep. 28, 2012 (Year: 2012).*

PCT/US2016/027630—International Search Report dated Aug. 30, 2016, 3 pages.
PCT/US2016/027630—Written Opinion of the International Searching Authority dated Aug. 30, 2016.
"From Digital Wallflower to Digital Disrupter", Accenture, www.accenture.com/insurance and www.accenture.com/technologyvision, 2014, 40 pages.
U.S. Appl. No. 14/689,674—Office Action dated Aug. 11, 2017, 17 pages.
U.S. Appl. No. 14/689,674—Response to Office Action dated Aug. 11, 2017 filed Nov. 1, 2017, 29 pages.
U.S. Appl. No. 14/689,674—Notice of Allowance dated Feb. 15, 2018, 15 pages.
Khanna et al., "Oracle BPM for Insurance", Sep. 2012, entire document (Year: 2012).
U.S. Appl. No. 15/005,876—Office Action dated Oct. 16, 2018, 19 pages.
U.S. Appl. No. 15/005,876—Final Office Action dated Apr. 16, 2019, 17 pages.
U.S. Appl. No. 15/005,876—Response to Office Action dated Oct. 16, 2018 filed Feb. 8, 2019, 21 pages.
U.S. Appl. No. 15/005,876—Response to Final Office Action dated Apr. 16, 2019, as filed Aug. 14, 2019, 21 pages.
U.S. Appl. No. 15/005,876 Notice of Abandonment (Anticipated) dated Apr. 28, 2020, 2pages.
PCT/US2016/027630—International Preliminary Report on Patentability, dated Oct. 26, 2017, 8 pages.

* cited by examiner

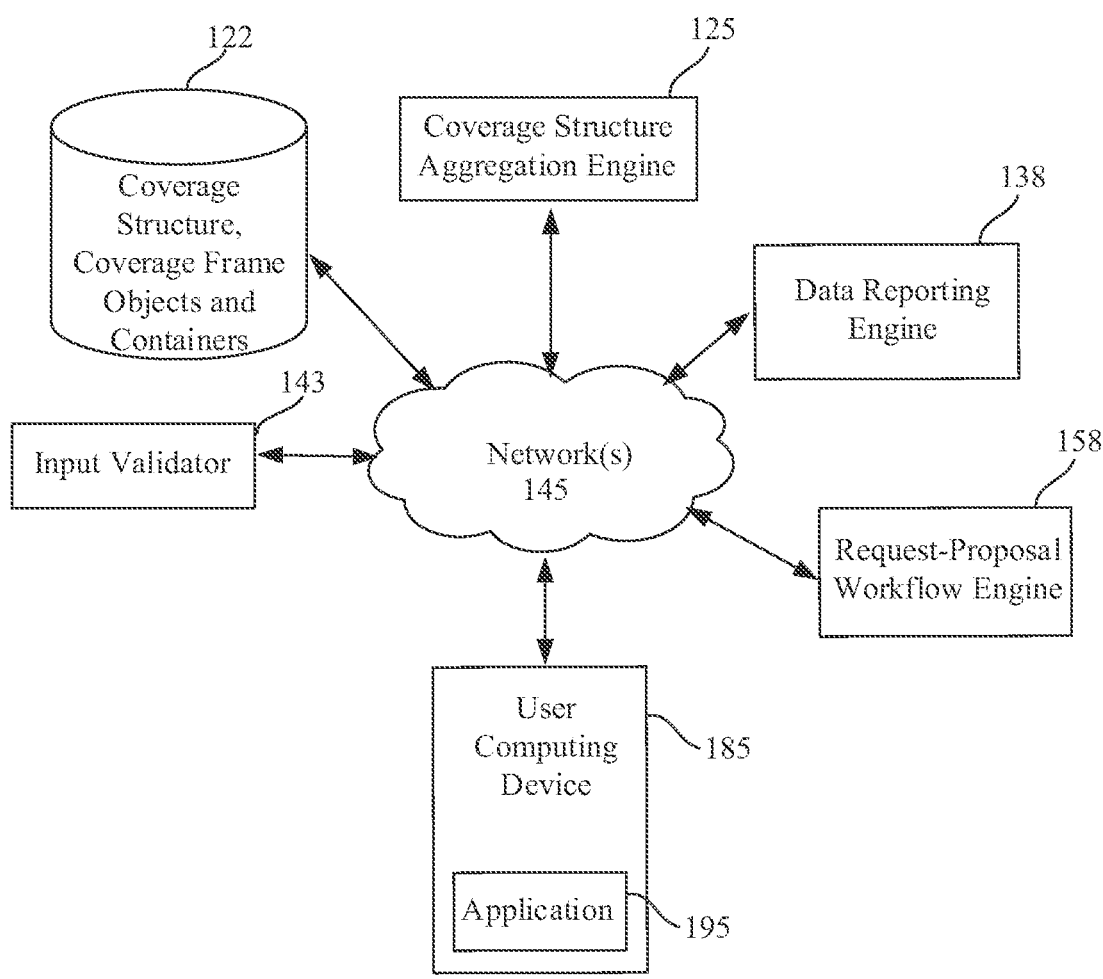
FIG. 1 Environment

| Prpsl. ID# | Prpsl. Type | Assoc. Prpsl. ID# | Prpsl. Status | Proposal Expiration Date | Lyr.Lim. | Lyr.Ret. | Cvge. Display | Prin.Cntrl.LOB | Mkt.% Basis | Prin.Terr. | Prm. | Currency Type | Lyr.Lim. | Lyr. Ret. | Mkt. | Ord.% Mkt.% | Cvge.Attach. Basis | SDA | Mkt. Cvge. Status | Exp.Date. |
|---|---|---|---|---|---|---|---|---|---|---|---|---|---|---|---|---|---|---|---|---|
| 33 | | | | | | | | Insurance | | South America | | GBP | 100000000 | 0 | | | Per Occurrence | | | 2015-10-30 |
| 35 | Quote | None | Pending | 2015-10-30 | 50,000,000 | 50,000,000 | Canvas | | 100% Cvge. | | 500,000.00 | | | | EU Insurance Ltd. | 50.0000 % | | N/A | Pending | -- |
| 36 | Quote | None | Pending | 2015-10-30 | 50,000,000 | 0 | Canvas | | 100% Cvge. | | 600,000.00 | | | | SA Insurance Ltd. | 50.0000 % | | N/A | Pending | -- |
| 37 | Quote | None | Pending | 2015-10-30 | 50,000,000 | 50,000,000 | Canvas | | 100% Cvge. | | 700,000.00 | | | | ABC, Inc. | 50.0000 % | | N/A | Pending | -- |

| Tower ID | Tower Name | Buyer Name | Prin.Indem.Type | Prin.Cntrl.LOB | Prin.Terr. | Currency Type | Lyr.Lim. | Lyr.Ret. | Cvge.Attach.Basis | Exp.Date. |
|---|---|---|---|---|---|---|---|---|---|---|
| 74 | EUIN-Other-RE-Prt | EU Insurance Ltd. | Proportional Treaty Re | Other Liability | Worldwide | GBP | 25000000 | 0 | Per Occurrence | 2015-11-18 |

| Prpsl ID# | Prpsl.Type | Assoc. Prpsl.ID# | Prpsl.Status | Proposal Expiration Date | Lyr.Lim. | Lyr.Ret. | Cvge. Display | Mkt.%Basis | Prm. | Mkt. | Ord.% Mkt.% | SDA | Mkt. Cvge. Status |
|---|---|---|---|---|---|---|---|---|---|---|---|---|---|
| 76 | Quote | None | Accepted | 2015-11-18 | 25,000,000 | 0 | Canvas | 100% Cvge. | 250,000.00 | EU First-Re | 90.0000% | N/A | Bound |

FIG. 2C

| Tower ID | Tower Name | Buyer Name | Prin.Indem.Type | Prin.Cntrl.LOB | Prin.Terr. | Currency Type | Lyr.Lim. | Lyr.Ret. | Cvge.Attach.Basis | Exp.Date. |
|---|---|---|---|---|---|---|---|---|---|---|
| 75 | SAIN-Other-RE-Prt | SA Insurance Ltd. | Proportional Treaty Re | Other Liability | Worldwide | GBP | 25000000 | 0 | Per Occurrence | 2015-11-18 |

| Prpsl ID# | Prpsl.Type | Assoc. Prpsl.ID# | Prpsl.Status | Proposal Expiration Date | Lyr.Lim. | Lyr.Ret. | Cvge. Display | Mkt.% Basis | Prm. | Mkt. | Ord.% Mkt.% | SDA | Mkt. Cvge. Status |
|---|---|---|---|---|---|---|---|---|---|---|---|---|---|
| 77 | Quote | None | Accepted | 2015-11-18 | 25,000,000 | 0 | Canvas | 100% Cvge. | 300,000.00 | Asia First-Re | 90.0000% | N/A | Bound |

TOWER: 33

Select Towers    Currency: USD

New Broker ✖

Select Broker: ✓
- AllLines Brokerage, Inc.
- Aon Crop
- AmWINS Group
- Specialty Brokerage, Inc.
- EULines Brokerage, Inc.
- AsiaLines Brokerage, Inc.

Descriptive Link: None

322 ALL
325 ABC
324 EUIN
MDCO — T33
361
MOS
354
364 SAIN
SPCL
353

Paths 372

| Buyer | Tower | Policy Contract (ID, Prpsl.Type) | Broker 1 | Broker 2 | Broker 3 | Market Contract (ID, Mkt.Cvg.Status) | Market | Detail |
|---|---|---|---|---|---|---|---|---|
| MDCO | T33 | P35: Quote - Pending | [Add] | ALL | [Add] | MC35: Pending | EUIN | [Isolate Path] |
| MDCO | T33 | P36: Quote - Pending | SPCL | ALL | [Add] | MC36: Pending | SAIN | [Isolate Path] |
| MDCO | T33 | P37: Quote - Pending | [Add] | MOS | [Add] | MC 37: Pending | ABC | [Isolate Path] |

384

Coverage Amount Data Display (currencies converted)

Select "Risk" From Description Link to show data

FIG. 3B

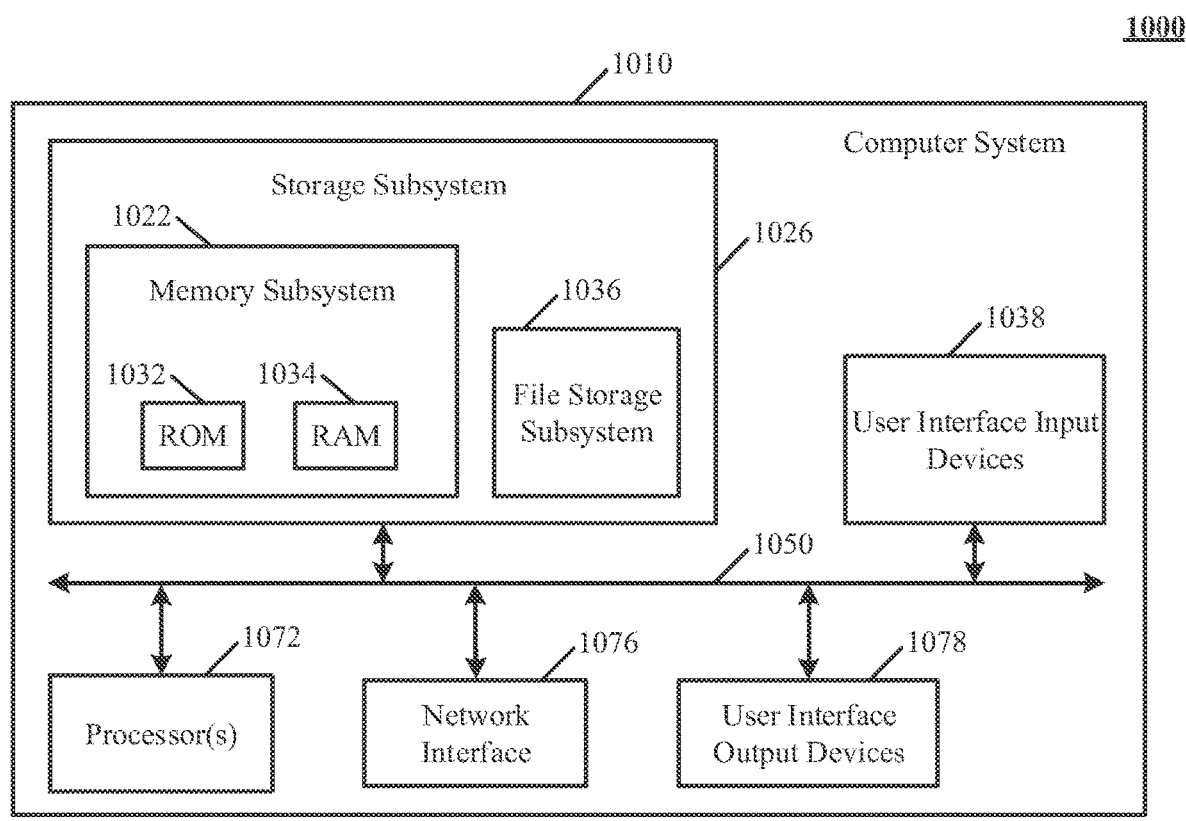
FIG. 10 Computer System

USER-MODIFIABLE INTERACTIVE DISPLAY OF PLACEMENT CHANNEL AND STATUS DATA

RELATED APPLICATION

This application is a continuation of U.S. patent application Ser. No. 15/005,876, entitled "USER-MODIFIABLE INTERACTIVE DISPLAY OF PLACEMENT CHANNEL AND STATUS DATA", filed Jan. 25, 2016 and is hereby incorporated by reference for all purposes.

This application is also related to U.S. patent application Ser. No. 14/689,674, entitled, "DATABASE SYSTEM AND OBJECT MANIPULATION REPRESENTING PLACEMENT LAYERS AND PARTS," filed on Apr. 17, 2015. That application is hereby incorporated by reference for all purposes.

BACKGROUND

The subject matter discussed in this section should not be assumed to be prior art, as the only information provided relates to the field of technology. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

The technology disclosed provides systems and methods that allow a knowledgeable user to modify interactively the display of database objects representing entities, placement channels and workflow status. Specially coded trees and graphs of nodes represent the overall flow and, optionally, status of placement workflows. A knowledgeable user can quickly understand, from the disclosed new display type, an overall workflow status, assess alternative placement strategies, and modify the display of such database objects interactively.

SUMMARY

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of this summary is to present some concepts related to some exemplary non-limiting implementations in a simplified form as a prelude to the more detailed description of the various implementations that follow.

The disclosed method includes generating node and edge data for display that depicts multiple risk placements on behalf of at least one requesting party through intermediaries to responding parties. In a distribution tree display, a requesting party is depicted as a requesting party node in a first region. At least two intermediaries are depicted as intermediary nodes in a second region adjoining the first region. The requesting party node is graphically connected by edges with the intermediary nodes. At least two responding parties are depicted as responding party nodes in a third region adjoining the second region and spaced apart from the first region; and the intermediary nodes are graphically connected by edges with the responding party nodes to depict relationships between the intermediaries and respective responding parties. Requesting parties sometimes communicate with the responding parties through the intermediary brokers. Another geo-coded map display also depicts as nodes a requesting party, intermediaries and responding parties, connected by edges that coincide with communication channels.

The disclosed technology includes edge annotation data generated for display: line width of the edges can represent calculated relative size of placements. Pattern, style, and color of edges can depict statuses of the risk placements through the intermediaries and with the responding parties. The disclosed technology includes transmitting the resulting node and edge data and the edge annotation data to a user device for display.

The technology disclosed includes a tangible computer readable storage medium that stores program instructions for graphically displaying distribution through placement channels for multiple placements, including representing multiple risk placements in a multi-tiered data model of one or more requesting parties, multiple intermediaries, and multiple responding parties in a first tier, with one or more of the responding parties that assume risk being treated, in a second tier, as requesting parties for a ceded risk.

The disclosed data model tracks risk placement parameters that specify amounts of risk ceded by at least some of responding parties to second tier responding parties; and the data model tracks status of the risk placements in the first tier.

Other aspects and advantages of the technology disclosed can be seen on review of the drawings, the detailed description and the claims, which follow.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 1 is a system environment for a special purpose insurance program.

FIGS. 2A, 2B and 2C show examples of tables for entry of data that produce stack data structures (towers) as in FIGS. 4A-4B.

FIG. 3B shows an example GUI interface used to enter and select display of intermediary information.

FIG. 10 shows an example computer system adapted to produce the special purpose, user-modifiable, and interactive placement analysis and graphic display disclosed herein.

DETAILED DESCRIPTION

Figure 3A:
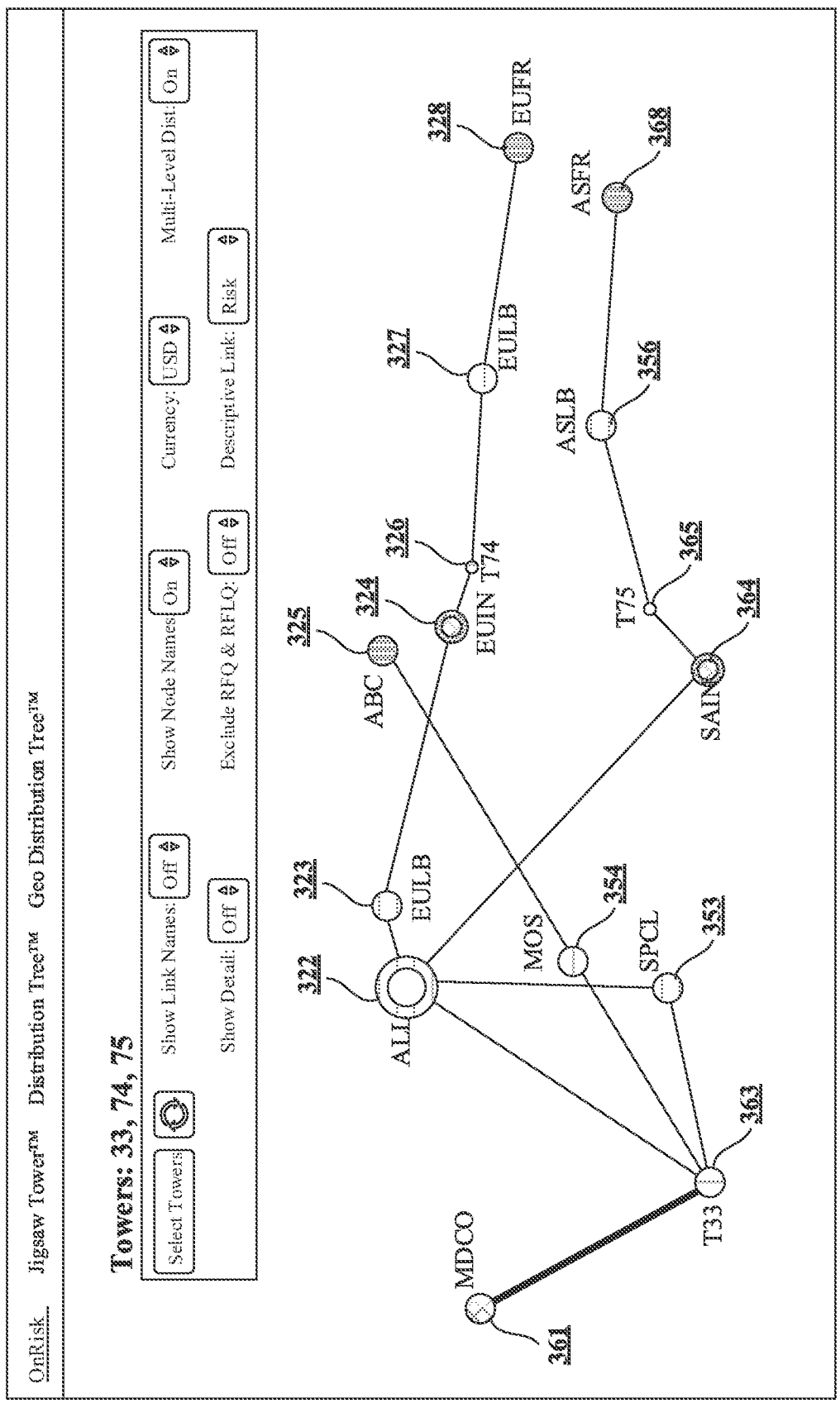
FIG. 3A shows an example single stem distribution tree in which the reinsurance is by proportional treaty, without status coding of the placement.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

A detailed description of example implementations of the technology disclosed is provided with reference to the FIGS. 1-10.

This disclosure begins with introductions to an industry and to technology disclosed to transform operations, especially during planning and tracking of progress of a placement workflow. Two use cases are described, each for two-tier planning and statusing of placements, differentiated primarily by the nature of the second tier. In the first use case, the second tier represents proportional reinsurance, also known as treaty reinsurance. In the second case, the second tier represents facultative reinsurance. Practically, treaty reinsurance is usually in place before placement of first tier insurance, for a class of risks. Facultative reinsurance typically applies to a particular insurance risk, and so the workflow for the second tier follows or runs in parallel with placement of the first tier insurance. Other channels and sorts of two-tier placements are described, to which the technology disclosed can readily be applied.

Introduction to Placement Workflows

The understanding and statusing of workflows involved in multi-tier placements will benefit greatly from the new and unique user-modifiable and interactive visualizations disclosed, from both trees and geo-coded maps of placement channels. Visualization of multi-tier placement channels and workflow status as trees or geo-coded nodes has not been attempted in the prior art, at least within these inventors' experience.

The multi-trillion dollar global property and casualty (P&C) insurance industry is called upon to handle the world's most challenging natural and manmade risks— hurricanes, earthquakes, jumbo jets, supertankers, oil drilling platforms, pandemics, kidnap & ransom, terrorism, mass product torts, cyber liability and countless others. These risks are covered by commercial insurance policies issued each year to large corporations and by reinsurance contracts that spread risks undertaken by insurance carriers. First tier policy holders sometimes purchase policies directly from carriers, but most sizable commercial placements are handled by insurance and reinsurance brokers, who possess the necessary expertise to manage complex placement workflows. Brokers act as the agent of the insured or reinsured to arrange insurance or reinsurance.

Many high-value or large-line risks exceed the capacity of a single insurance or reinsurance carrier. As a result, large-line risks are commonly subdivided into multiple layers or shares for cession to multiple, selected carriers, and assembled into a complex insurance program that is designed to meet the buyer's risk management objectives. Already complicated by the involvement of multiple markets, these placements are made even more complex by a number of market factors that tend to increase transactional friction. For example, once a large buyer needs to access global insurance capacity, the assigned, primary broker will require global distribution of placement. The primary broker relies on correspondent relationships with placing intermediaries in the U.S., Bermuda, London, continental Europe, Asia and other dominant insurance markets. Global distribution raises intricate processing issues relating to cross-currency and multi-lingual transactions in different time zones. As multiple markets respond to placement components, the broker must organize, coordinate and interpret a surge of quotes and coverage terms transmitted by the interested markets. Throughout the placement workflow, clients and brokers face relentless time pressure to place these high-value risks in a timely manner lest a buyer suffer even the slightest lapse in coverage.

In recent years, many commercial brokers have discovered that traditional insurance and reinsurance products can no longer fully satisfy the largest-line coverage requirements. Seeking diversified coverage for low-frequency, high-severity losses, such as losses caused by windstorms, earthquakes and other natural catastrophes, buyers are increasingly turning to capital market capacity sources in the form of catastrophe bonds (CAT bonds), industry loss warranties (ILWs), catastrophe swaps and other insurance-linked securities (ILS) funded by institutional investors. A broker assembling a property catastrophe reinsurance tower for a large insurance carrier, for example, will need to compare the performance of traditional reinsurance structures against these innovative capital market options.

Yet another issue for buyers is avoiding concentrating risk distribution in a single geographic area. In one implementation example, a prudent buyer of earthquake insurance will consider the geographic locations of insurance providers, to address the possible correlation between risk distribution and locus of risk.

In addition to brokers, buyers may also use the technology disclosed. For example, a first-tier buyer may decide to choose among offerings from multiple brokers who place insurance. Reliance on multiple brokers requires the buyer to communicate effectively and consistently with the brokers. The buyer using the technology disclosed can benefit from entering into a central repository one set of data that specifies the insurance requirements to be utilized by all of the brokers offering placements. This central repository facilitates an apples-to-apples comparison of responses from multiple brokers.

In addition to brokers and buyers, placing brokers may also use the technology disclosed. A placing broker may face challenges in evaluating and weighing key deal parameters as it receives and compiles quote-related data from the markets invited to participate in a placement. For instance, the quotes may vary by credit rating and financial security of interested carriers; policy pricing; administrative complexity; and numerous other technical factors.

As the placement progresses, brokers conventionally rely on spreadsheet and tabular formats to compile transaction data, which they may send to their clients for review and approval at key stages in the placement process. At critical decision stages (e.g., initial request for quote (RFQ); pre-binder client approval), the broker may prepare by hand some type of a visual representation of the overall placement, such as a layer chart. This manual process of generating layer charts relies on common spreadsheet or presentation formats (e.g., Microsoft Excel or PowerPoint) or generic drawing tools. Buyers who purchase complex insurance or reinsurance coverages directly from their chosen carriers find the occasional placement process even more challenging than brokers do. Brokers and buyers purchasing insurance have a limited ability to sketch out progress visualizations of placement. Only crude graphics, such as coverage layer charts, are typically used and even layer charts are rarely prepared. For instance, a crude layer chart may be prepared by a broker on the eve on an important client meeting. Day to day, spreadsheets and emails tend to be the tools of choice.

Reliance on cumbersome manual methods restricts a broker's or buyer's capacity and willingness to conduct a concurrent evaluation of alternative placement strategies or re-structure a placement dynamically in response to shifting capacity availability or pricing opportunities in the global marketplace.

Introduction to Graphic Analysis Technology Disclosed

This application uses the terminology "stack data structure" to refer to the entity that we called a "composite coverage structure" or "plan tower structure" in the related application, "Database System and Object Manipulation Representing Placement Layers and Parts," incorporated herein by reference.

Two risk transfer placement visualizations are disclosed, along with the underlying data analysis required to generate them. We call the analyses and visualizations distribution trees and geo-coded maps of placement nodes. In the interest of conciseness, the examples below refer to insurance and reinsurance as first and second tiers, but other profiles of risk transfer or ceding can benefit as much or more from application of the technology described. The same components, including data structures, analyses and visualizations, apply to the non-traditional risk transfer instruments identified above.

Figure 6:
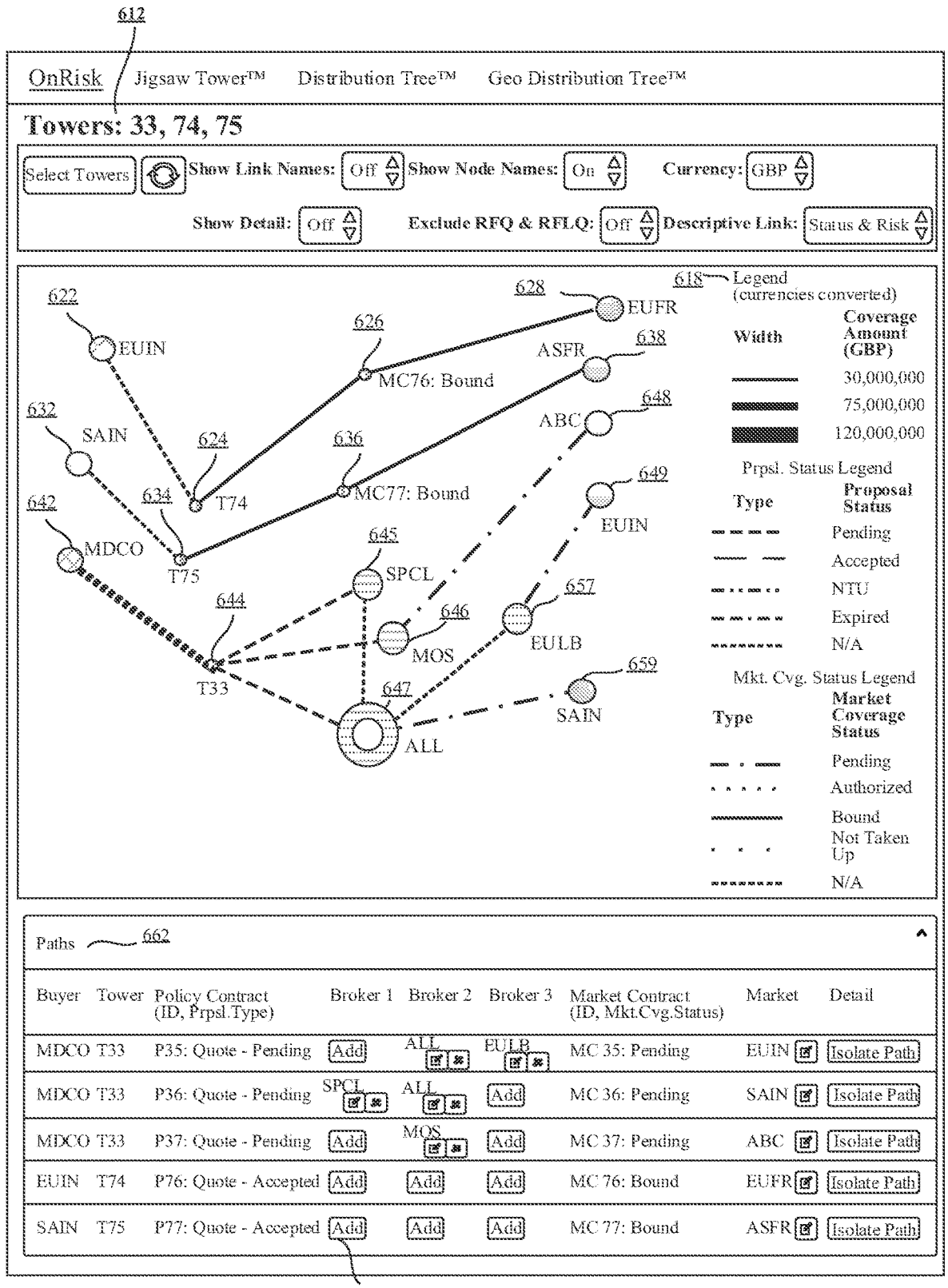
FIG. 6 illustrates an example multi-stem distribution tree GUI, with a legend and a table of paths after entry of intermediary information.

The distribution trees can have one stem from a single root node, as in FIG. 3A, or multiple stems, as in FIG. 6. Each node in a tree represents an organization and/or actor(s). Nodes are connected by placement channel edges that, in practice, are lines of communication. In the examples shown, the distribution trees organize placement channels from left to right, from buyer optionally through intermediary(ies) to markets. Markets that cover risks for corporate clients often buy reinsurance, in a second tier of the distribution trees. In the single stem FIG. 3A, insurers who buy reinsurance appear midway from left to right and begin the second tier of the distribution tree, which ends with reinsurers in this example. Optionally, data structures that represent interrelationships among parts or other aspects of an overall risk transfer profile (see related patent application) can be identified (e.g., 363, 326, 365, 624, 626, 634, 636, and 644) on the channels between nodes on either a single or multi-stem diagram.

A multi-stem diagram can be used to provide a different view of multiple tiers, to represent multiple lines of risk transfer for a single buyer, or to represent multiple buyers. In the multi-stem FIG. 6, some insurers appear both on the right, as sellers of insurance, and on the left as buyers of reinsurance. The legend of FIG. 6 provides an example of how the connections between nodes, the stems and branches of the trees can be coded, with magnitude and status information. Viewing a distribution tree, even a newcomer to placement can quickly grasp the structure and status details of a placement effort.

The geo-coded maps (FIG. 7) show participating entities as nodes placed on a map in locations that correspond to their geographic locations. This provides an alternative visualization from the analyses used to generate the distribution trees. The placement and communications flow can be traced from a buyer node, such as MDCO 764 in South America, through intermediary(ies) to insurers (EUIN 736 and SAIN 766) and on to reinsurers (EUFR 745 and ASFR 769). For consistency, the magnitude and status coding shown in the legend of FIG. 6 can be applied to geo-coded maps. An advantage of the geo-coded maps is that time zone differences, which impact communications among participants, can be made readily apparent. In some geo-coded maps, the buyer node can be positioned to represent the locus of a risk, rather than the location of the buyer's insurance department. The territory insured, such as South America, can be visually emphasized by color coding (not shown) or a fill pattern, for instance.

Representation of intermediaries in these visualizations allows a viewer to identify and to gauge performance of the intermediaries from a single display. Either distribution trees or geo-coded maps can represent both reported status and calculated magnitudes/pricing of placements. Progress of individual brokers in obtaining proposals and in binding coverages can become immediately visible from status coding (e.g., the legend of FIG. 6). The magnitudes of placements also can be coded on edges that connect nodes. Widths of edges can be coded relative to the stem, which represents the overall magnitude of the risk transfer. Branches of a completed placement will be no wider than the stem, because no part of the placement is greater than the whole. When over-subscriptions are available during placement, some branches could be displayed with greater width than the branch from which they emerge. Alternatively, price coded branches can represent the relative pricing of markets that are competing within a layer.

Tool tip information can be provided in response to a cursor rolling over a node or edge or in response to another control object (e.g., gesture or finger touch) selecting a node or edge. Activating an intermediary node or an edge connecting a buyer to an intermediary, for instance, can reveal a summary of the broker's projections, received proposals and/or proportion of the projection attained to date. Rolling over the market node or an edge connected to a market node can reveal supplemental information on a particular proposal, such as the information in the lower portions of object information tables 462, 466 of the stack data structure representations in FIGS. 4A-4B. When a node is both a selling and buying entity or an intermediary with multiple roles, a roll over can reveal information concerning one or more roles, or it can reveal a summary of all the node roles. With this introduction in mind, we turn to the figures.

FIG. 1 illustrates a multi-device system environment in which the technology disclosed can be practiced. In this application, system refers to software running on one or more apparatuses, rather than systematic thought. The components illustrate one computer and network implementation. At least one data store 122 holds a variety of data objects. These objects include the composite coverage structure, coverage frame objects and attributes of these objects. Attributes of objects depend on the placement context. For instance, some of the attributes available to describe proportional treaty reinsurance in a second tier will not apply to a first tier. The composite coverage structure is also referred to as the stack data structure or the plan tower structure. Objects representing aspects of the GUI (graphic user interface) also can be persisted in the data store. GUI elements can include a canvas, palette, controls and information panels.

In some implementations, the data store can store information from one or more visual workspaces into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

An input validator 143 receives data that populates attributes of the objects. It validates the data and persists objects with attributes in the data store 122. Input typically is received via a network 145 from a user computing device 185. The user computing device 185 runs at least one application 195. Applications can be a browser, special purpose application, a spreadsheet, or an application used to complete forms. Data can be entered directly by a user using a GUI to the input validator 143, or can be compiled, for instance in a spreadsheet, uploaded in bulk, and validated. Input data can be translated from another system or format.

Input is handled in various stages of interaction by request-proposal workflow engine 158. As further explained below, some steps precede others, such as the request for quotation typically preceding a quote; or a lead quote typically preceding a following quote. A request-proposal workflow engine can track the status of outstanding requests and maintain threads of related requests and proposals or quotes.

The data reporting engine 138 constructs the GUI to be transmitted for display on the user computing device 185. One component analyzes data tables, constructs a graph (tree or geo-coded) that connects nodes, positions the nodes, calculates relative magnitudes of risk transfer through channels, codes connecting edges with the calculated magnitudes, verifies placement status including past and approaching expirations, and codes connecting edges with current status including expiration warnings.

Another component that can be used in the GUI is a report of objects contained within the composite coverage structure, as described more fully in the related prior application. A composite coverage structure (stack data structure) aggregation engine 125 aggregates, summarizes and reports this information. GUI components are further described below.

Figure 4B:
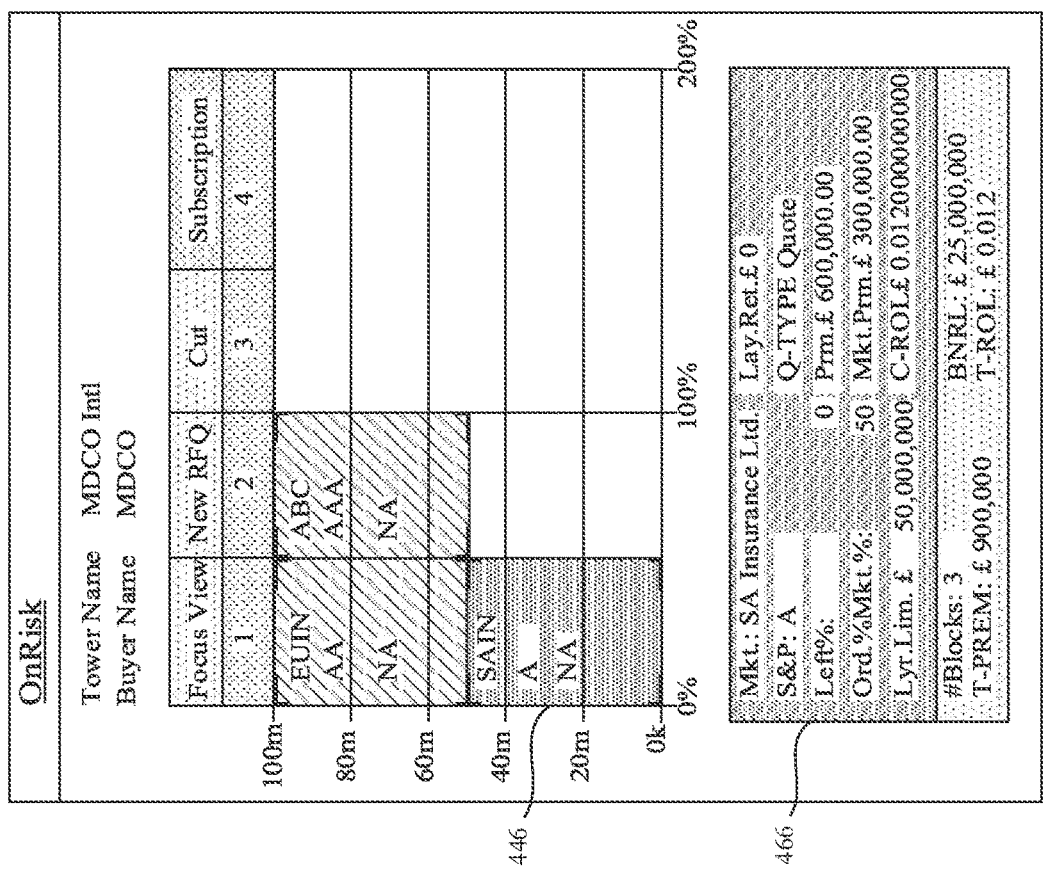
FIGS. 4A-4B illustrate towers for coverage of MDCO, with details of EUIN and SAIN quotes, respectively.
Figure 4A:
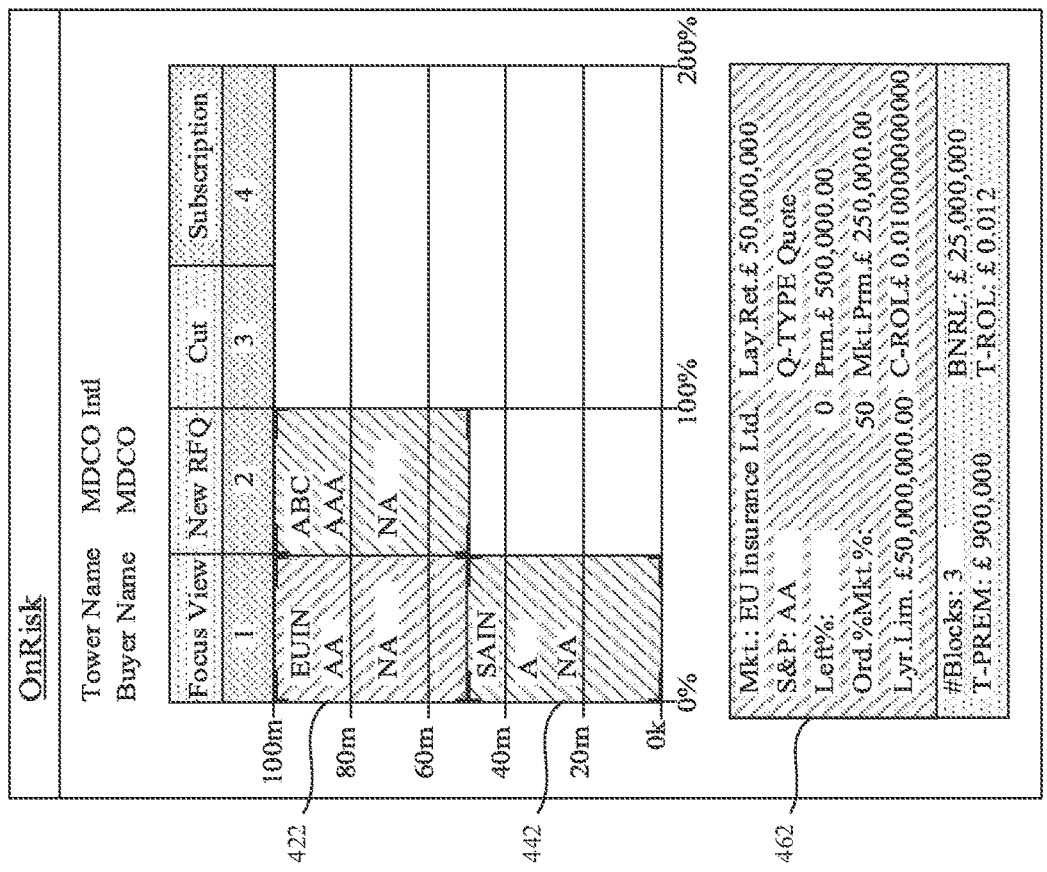

FIGS. 2A, 2B and 2C show examples of tables for entry of data that produce stack data structures (towers) as in FIGS. 4A-4B. The disclosed technology for analyzing and visualizing the status of complex interactions and workflow includes a graphical user interface (GUI) usable to handle requests for quotes (RFQ), quotes, requests for lead quotes (RFLQ), lead quotes and following quotes, as described below relative to FIGS. 2A, 2B and 2C. Users can enter transaction requests from buyers; responses, including quotes from markets; and can select coverage towers to view.

Use Case #1: Insurance and Proportional Treaty Reinsurance Placements

Proportional or treaty reinsurance refers to a type of reinsurance in which the reinsurer shares similar proportions of the premiums earned and the claims incurred by the reinsured (the company that obtains reinsurance coverage), plus certain associated expenses. For a proportional treaty reinsurance use case, some or all of the underlying risk is ceded to the reinsurer(s) by means of a treaty contract that applies to multiple risks within a given class. Under a treaty reinsurance contract, the reinsured agrees to offer and the reinsurer agrees to accept all risks of certain size within a defined class. Under a treaty, coverage is applied categorically for a substantial portion of some aspect of a reinsured's business. That is, a proportional treaty prearranges sharing of risk between an insurance company and a reinsurer. Treaty reinsurance can typically be obtained before an insurer accepts risk, for example, from a corporate insured.

In one example, a corporation that is buying insurance secures workers' compensation coverage and general liability coverage for work on oil rigs. Because the magnitude of the workers' compensation risk per incident is relatively small, and no single catastrophic loss will typically be incurred, a reinsurance treaty can be negotiated by the insurer for policies covering oil rig operations, in anticipation of requests from buyers of insurance. Because the amount of money payable under workers' compensation is well understood, terms can be readily negotiated for a reinsurance treaty. In one example, the entirety of the risk assumed by the insurance carrier in writing a USD 1,000,000 per occurrence, 100% share, USD 0 retention workers' compensation insurance policy can be entered into coverage entry tables, such as the tables described below, to evaluate the need for cession of some portion of this risk.

In another example, the insurance buyers for a large corporation MediaCo, Inc. (MDCO) determine that the corporation will require GBP 100,000,000 per occurrence limit, 100% share, GBP 0 retention other liability insurance coverage for the next account year, to be placed in diversified domestic and foreign markets. Due to the corporation's capacity needs, the buyers and their intermediaries believe that the risk to be placed (RTBP) will not be assumed by a single insurance carrier, and will therefore require placement of multiple, stacked coverage layers, and will also possibly require placement of multiple shares within one or more of the stacked coverage layers. A request for quotes is issued, and brokers secure quotes and disclosures of reinsurance contracts (bound proportional treaties). These quotes and contracts can be entered into coverage entry tables as options for consideration for the requested risk coverage.

FIG. 2A shows an example coverage entry table for Tower 33 200A with Tower ID 33 212, Tower Name MDCO Int'l 213, and Buyer Name MediaCo, Inc. 214 populated with data. Note that the data entry table 200A for Tower 33 includes three pending proposals from EU Insurance, Ltd. 216; SA Insurance, Ltd. 217; and ABC, Inc. (ABC) 218. (These proposals are reflected in the distribution tree diagram of FIG. 3A and the towers of FIGS. 4A-4B.) Example coverage entry table for Tower 74 200B includes a bound quote for reinsurance buyer EU Insurance Ltd. 242 from EU First Re 266 displayed in FIG. 2B. Example coverage entry table for Tower 75 200C includes a bound quote for reinsurance buyer SA Insurance Ltd. 282 from Asia First-Re 286, displayed in FIG. 2C. In some example cases, a pending proposal maintains that status for the period, for example 30 days, during which the market contract is valid.

In some implementations, an example GUI can include a list of coverage towers available to be selected for display and can include a "generate graph" icon (not shown) usable to request generation of a distribution tree or geo-coded map that illustrates the distribution of coverage for selected coverage towers.

Graphical Display of Risk Distribution

The first disclosed graphical display of risk distribution, implemented as a distribution tree, includes a visual display of the network of risk to potentially be assumed by multiple markets, optionally through multiple brokers. The distribution tree graphically displays risk distribution through placement channels for multiple placements. The examples illustrated reflect two tiers of insurance. When multiple brokers are involved in the first tier, such as a producing broker and one or more placing brokers, the analysis and visualization disclosed can be useful even for just one risk transfer tier, as it is helpful to visualize multiple intermediaries in a chain between the requesting and responding entities.

Visual elements of the distribution tree can also represent multiple risk placements in a multi-tiered data model of one or more requesting parties, multiple intermediaries, and multiple responding parties in a first tier, with one or more of the responding parties that assume risk in the first tier being treated, in a second tier, as requesting parties for the cession of risk in the second tier. The data model tracks risk placement parameters that specify amounts of risk ceded by at least some of first tier responding parties to second tier responding parties and tracks status of the risk placements in the first tier and in the second tier.

FIG. 3A shows an example two-tier distribution tree with proportional treaty reinsurance covering risk transfer needs of corporation MDCO 361, using the pending and bound quotes listed in the coverage entry tables in FIG. 2A, FIG. 2B and FIG. 2C. In this example, proposed coverage for the first tier requesting party—buyer MDCO 361—is mapped to tower 33 363, with the width of the path calculated and coded for representation as an edge in the tree. Buyers and markets are distributed in a left to right orientation, with buyers represented by nodes with a crosshatched fill. FIG. 3A also shows markets, which are represented by nodes with a shaded fill. Example first-tier market ABC Inc. 218 is displayed as ABC 325; example first-tier market EU Insurance, Ltd. 216 is displayed as EUIN 324; and example first-tier market SA Insurance, Ltd. 217 is displayed as SAIN 364.

Responding parties EUIN 324 and SAIN 364 in the first tier are treated as requesting parties for the ceded risk in the second tier, and the disclosed technology graphically displays these organizations in dual roles—first-tier insurance markets and second-tier reinsurance buyers—representing them by nodes with outer shading fill and inner crosshatched fill. Brokers, including those displayed as EULB 323, 327, SPCL 353, MOS 354 and ASLB 356, are represented by nodes with horizontal fill. When the system, which includes one or more devices, is being operated by a broker, for example AllLines Brokerage, Inc. displayed as ALL 322, the broker operating the system may be identified via an icon different from the ones in use for other brokers. This icon differentiation can aid the system operator to readily locate their own proposed or actual placements. The interactive visualizations graphically displayed by the disclosed technology are user-modifiable. For example, a user may add a broker to a placement channel, as shown in FIG. 3B.

FIG. 3B shows an example GUI interface used to enter and, in response to user-controlled inputs, to select the graphical display of intermediary information, in this case adding new brokers to placement channels for tower 33 for buyer MDCO 361. Paths 372 is a table of policy contract information that includes add buttons 384 for triggering the user-controlled option of adding up to three brokers for each individual path, in the example shown. Paths running from buyer MDCO 361 through operating broker ALL 322 have market contracts with market coverage status pending to market EUIN 324 and to market SAIN 364, respectively. A path running from buyer MDCO 361 through broker MOS 354 has a market contract with market coverage status pending to market ABC 325. Producing broker SPCL 353 is also part of the path running from buyer MDCO 361 to market SAIN 364.

FIG. 2B shows an example coverage entry table for Tower 74 200B with Tower ID 74 241 populated with data. Note that the data entry table 200B for Tower 74 includes an accepted proposal with proposal ID 76 262 from EU First-Re (EUFR) 266 that includes a quote whose market coverage status is bound. In FIG. 3A Tower 74 326 is also shown as part of the placement channel leading to second-tier market EUFR 328. FIG. 2C shows an example coverage entry table for Tower 75 200C with Tower ID 75 281 populated with data. Note that the data entry table 200C for Tower 75 includes an accepted proposal with proposal ID 77 285 from Asia First-Re (ASFR) 286 that includes a quote whose market coverage status is bound. In FIG. 3A Tower 75 365 is also shown as part of the placement channel leading to second-tier market ASFR 368. Optionally, towers and market contracts are represented by nodes with vertical fill (for example, 624 and 626). Optionally, towers and market contracts are represented, respectively, by nodes with different, distinguishing fills (not shown), and optionally tower nodes and market contract nodes are included for completeness (for example, 624 and 626), but they could be omitted from the distribution tree.

Intermediaries are represented by intermediary nodes in a second region adjoining the first region—ALL 322 and MOS 354 are some of the intermediary nodes in single stem FIG. 3A. Intermediary nodes are graphically connected, directly or indirectly (for example, through other intermediary nodes, such as EULB 323), by edges to the responding parties' nodes to depict relationships between the intermediaries and respective responding parties that communicate through the intermediaries. The requesting party nodes are also graphically connected by edges to the intermediary nodes, directly or indirectly (for example, through other intermediary nodes, such as SPCL 353). In the example of FIG. 3A, MDCO 361 is the first-tier requesting party. Connections between buyers and towers are displayed as edges whose widths, optionally, are proportional to the coverage amounts. Optionally, intermediary nodes are graphically connected indirectly to requesting party nodes through tower nodes (for example, Tower 33 (T33) 363), and optionally intermediary nodes are graphically connected indirectly to responding party nodes through market contract nodes (not shown), but tower nodes and market contract nodes could be omitted from the distribution tree. Another example distribution tree, described infra, further exemplifies visual elements of this multi-tiered data model.

FIGS. 4A-4B illustrate towers for coverage of MDCO, with details of EUIN and SAIN quotes, respectively. FIG. 4A shows a tower representation of three quotes described in coverage entry table 200A in FIG. 2A for requesting party MDCO. The portion of the tower for EUIN 422 is selected (highlighted), and the object information table 462 displays coverage specifics for the EUIN proposal, including the proposal type (also referred to as "Q-TYPE") as "quote," values for premium and market premium, etc. FIG. 4B shows object information for the SAIN proposal in a format similar to that described for the EUIN proposal in FIG. 4A; when SAIN is selected, object information table 466 displays coverage specifics for the SAIN proposal. Related patent application Ser. No. 14/689,674 includes a detailed description of the tower interface.

Figure 5B:
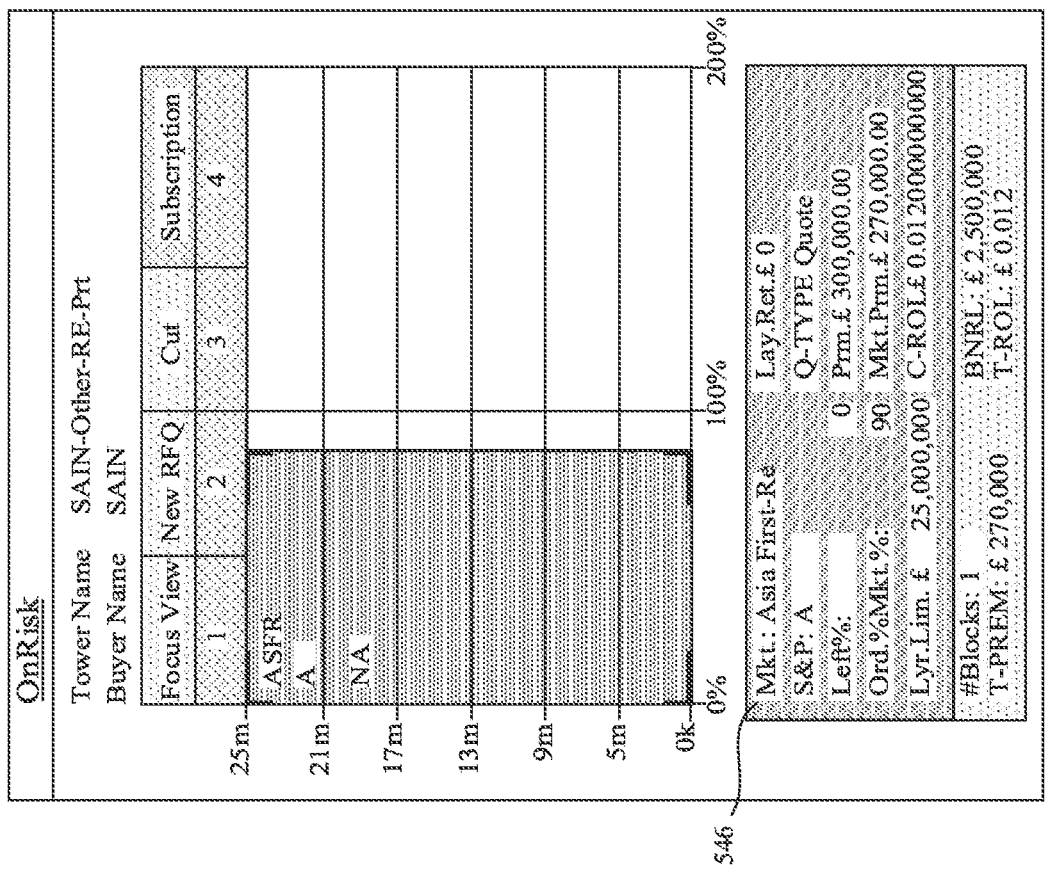
FIGS. 5A-5B illustrate towers for reinsurance of EUIN and SAIN, respectively.
Figure 5A:
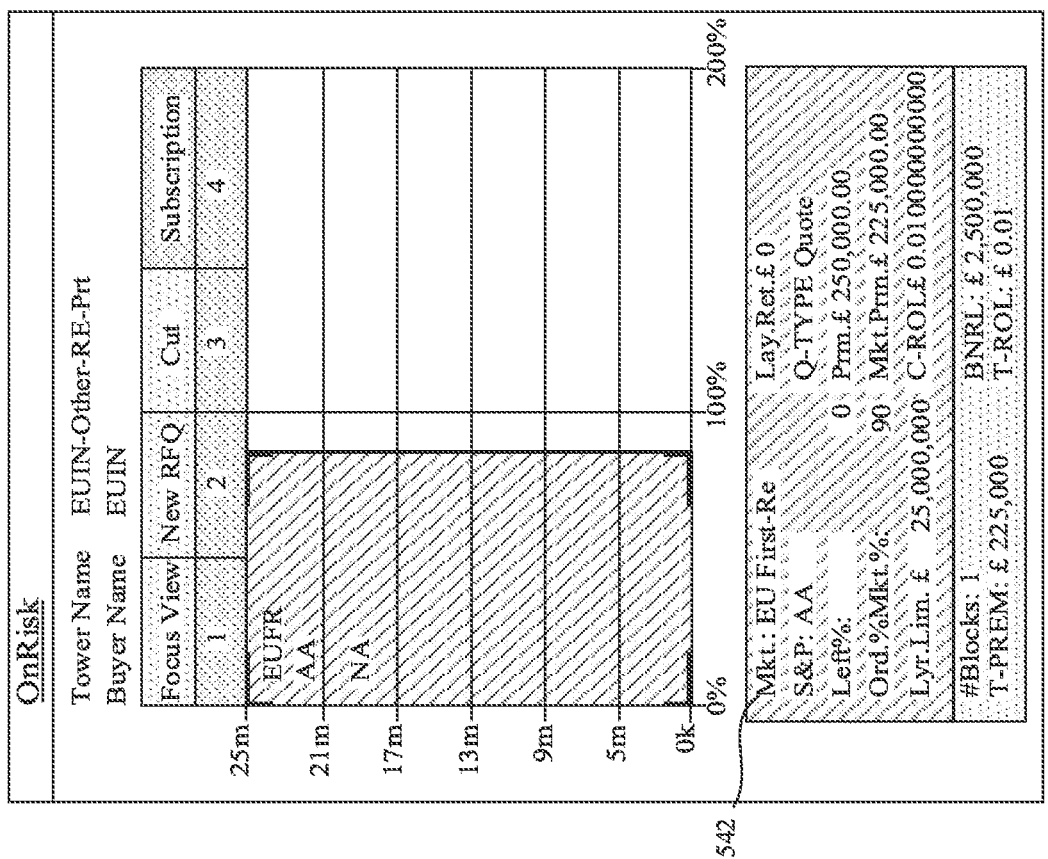

FIGS. 5A-5B illustrate towers for reinsurance of EUIN and SAIN, respectively. FIG. 5A shows a tower representation with insurer EUIN in the role of buyer for reinsurance market EU First-Re (EUFR) 542. Similarly, FIG. 5B shows a proportional treaty tower for insurer SAIN and reinsurer Asia First-Re (ASFR) 546.

The disclosed technology for graphically displaying distribution through placement channels for multiple placements makes it possible to improve operations, especially during planning and tracking of progress in risk placement.

FIG. 6 shows an alternative, multi-stem graphical display of a distribution tree for towers 33, 74 and 75 612, with visual elements arranged to represent the same basic data as shown in FIG. 3A and discussed supra, optionally additionally showing status information and market contract nodes (626 and 636) as discussed supra, and optionally additionally showing currencies converted to GBP. For this data visualization, EUIN 622, SAIN 632, and MDCO 642 are shown as buyers (nodes-with-crosshatch-fill) on the left side of the display, in a first region. Tower node T33 644 maps to three brokers in a second region: SPCL 645, MOS 646 and ALL 647. Tower node T74 624 maps to bound market contract MC 76 626, and Tower node T75 634 maps to bound market contract MC 77 636. Pending and bound market contracts are listed in the paths table in the market contract column. Markets EUFR 628, ASFR 638, ABC 648, EUIN 649 and SAIN 659 are readily visible as nodes-with-shaded-fill on the right side of the tree, in a third region, with each node associated with a specific tower and either brokers or bound market contracts. That is, responding parties are depicted as responding party nodes in a third region adjoining the second region and spaced apart from the first region. In one example implementation, broker information can be added using the Add 664 selection in the Paths section of the user interface. In some implementations, the addition of an added node to the data model of requesting parties, intermediaries, and responding parties causes rearrangement of positions of the nodes in the data for display without a user input specifying a location in the display where the added node should appear.

In FIG. 6, the widths of edges between nodes are coded to represent the proposed coverage amounts—depicting the relative size of the risk placements through the intermediaries and with the responding parties. In addition to varying widths, edges between nodes can be coded to represent other information using other means of visual differentiation, including varying line types, such as patterns and styles, and colors. In some implementations (not shown) both line types and colors (not shown) of edges can be used to represent proposal statuses and market coverage statuses. Because colors do not transfer well to the grayscale figures, in the example shown in FIG. 6, proposal statuses and market coverage statuses are shown with varying line types, without using color. In the example shown in FIG. 6, a relatively wide line, representing the coverage amount, is shown between MDCO 642 and tower 33 644, as compared to the three branches emanating from tower 33 644 through intermediary nodes to markets ABC 648, EUIN 649 and SAIN 659. In some implementations (not shown), the system can color (not shown in the figures as reproduced) and pattern edges (using, for example, other patterns than those shown) to code proposal and market coverage statuses of the risk placements through the brokers and with the markets. For the example shown in FIG. 6, Legend 618 provides the key used for width coding of coverage amounts and for pattern coding of proposal status and market coverage status. Edges displayed as long dashes between Tower node 33 644 and the three brokers SPCL 645, MOS 646 and ALL 647 denote that the proposal status is pending for each of the three policy contracts associated with Tower 33. The displayed long and short dashed edges between the three brokers MOS 646, EULB 657 and ALL 647 and the respective markets ABC 648, EUIN 649 and SAIN 659 represent pending market coverage statuses. The displayed very short dashed edges, for example between MDCO 642 and tower 33 644, represent "not applicable" (N/A) proposal status and market coverage status. This graphical representation of buyers, brokers and markets produces the new result of enabling a relatively inexperienced user to understand the channels and status of a placement. The advantage of calculating and presenting in a GUI a visualization of placement channels and status is visually apparent in FIG. 6, from introspective consideration of how relatively little effort it takes the viewer to understand the multi-stem distribution tree, as compared to how much time is necessary to read and understand the table of paths 662 at the bottom of the figure.

Optionally, as shown in FIG. 3A, the distribution tree shows links between indemnity tiers. Additionally, the distribution tree is useful throughout the risk placement contract cycle: the contract stage differs compared to the premium stage, and again differs when compared to analyzing claims. In the contract stage, the distribution tree can make it feasible to architect complex deals and follow through various stages of the process, tracking capacity and determining premium distribution responsibility. The distribution tree can also support engagement directly between a buyer and the market. In one example, concerns can be raised about the activities of a broker if all of their contracts are pending, when viewed on a distribution tree. In addition to coding of communication status leading to placements, premium distribution can be coded on the edges. Either absolute premiums (total dollars) or premium rates (e.g., dollars per thousand) can be coded on the width of a line or made available when an edge or market node is selected. Coding can be scaled to the entire placement or to rates proposed within a particular layer, among competing offers. This can be useful when comparing proposals in case of over-subscription or alternative markets. In the claim stage, magnitudes of claim responsibility and status of reimbursement can be coded on edges, following the principles and patterns described above.

The geo-coded map, a location-based graphical display of global risk distribution, serves as an additional tool for architecting complex risk placement deals and following through various stages of the process of diversification of risk. In some use cases, placement channels may trace from a requestor's corporate office location to markets, as distinct from identifying a risk location. For other use cases, the requestor's risk location may be the starting point of the node graph.

Global Redistribution of Risk to Geographically Designated Responding Parties

The disclosed technology includes geo-coded maps that graphically depict a global distribution of placement channels and entities involved. Multiple risk placements are represented in a multi-tiered data model of one or more requesting parties, multiple intermediaries, and multiple responding parties in a first tier. One or more of the responding parties that assume risk are treated, in a second tier, as requesting parties for a ceded risk. The requesting parties, the multiple intermediaries, and the multiple responding parties are geographically designated for their respective locations on a map.

In one example, markets under consideration can be shown graphically on a global map. Additionally, the status of proposals and market contracts can be overlaid onto a global map; and status and risks can be combined in yet another graphical visualization.

Figure 7:
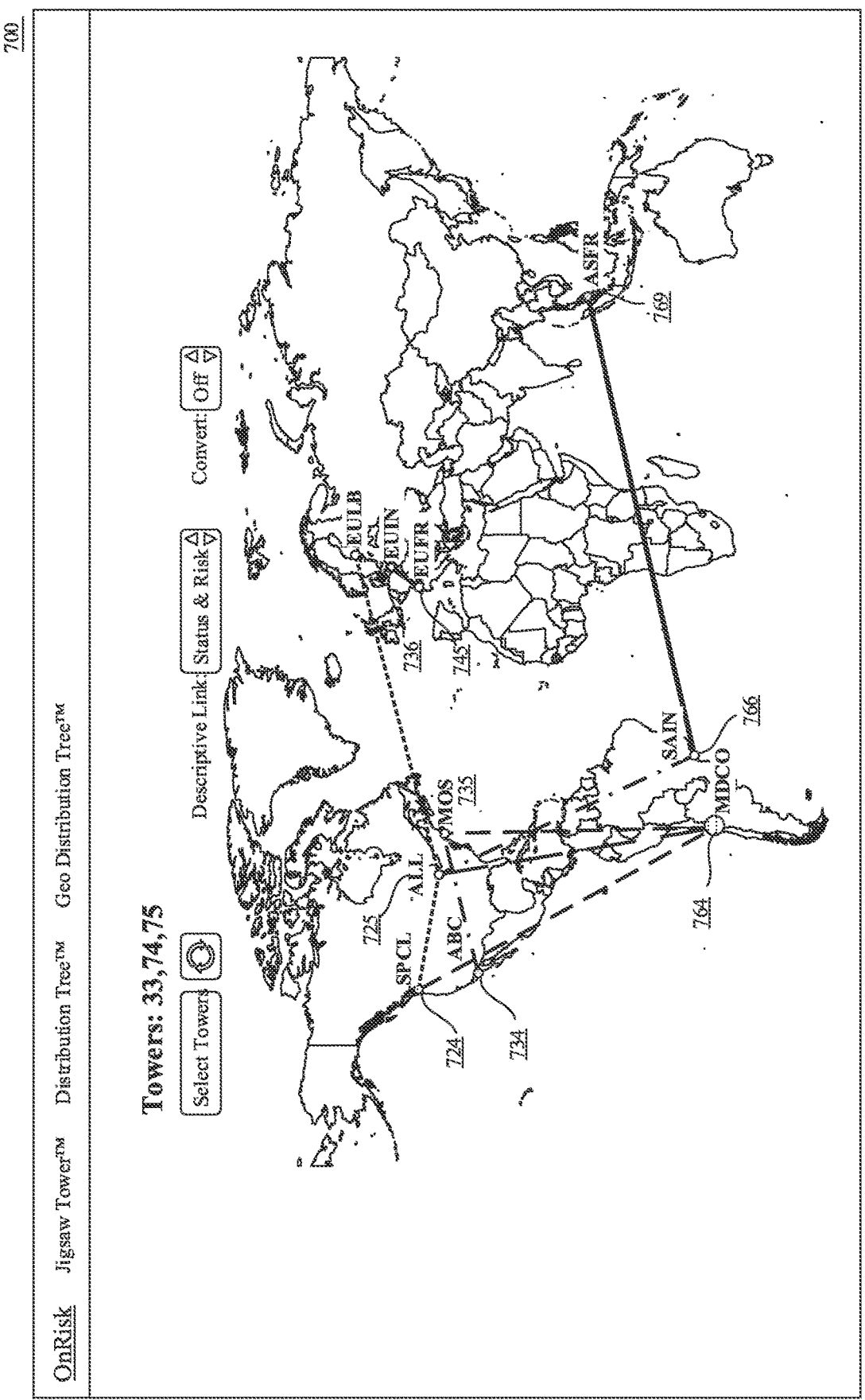
FIG. 7 illustrates a geo-coded map of placement entities and channels coded to depict placement status. Placement of reinsurance before the rest of the placement in this map is indicated by coding of certain edges.

FIG. 7 shows an example geo-coded map 700 with multiple risk placement options for covering the insurance needs of corporation MDCO 764, using the quotes listed in the coverage entry tables in FIG. 2A, FIG. 2B and FIG. 2C. Markets EUFR 745, ASFR 769, ABC 734, EUIN 736 and SAIN 766 are readily visible as nodes. In one example implementation (not shown), the country or region might be highlighted with some graphical highlight to show the principal territory of a buyer, broker or market, such as changing the visual representation of South America to show that it is the principal territory of MDCO 764.

Edge annotation data, generated for display, optionally codes line width of the edges to depict relative size of the risk placements through the intermediaries and with the responding parties, and optionally codes the edges to depict statuses of the risk placements through the intermediaries and with the responding parties. The node and edge data for display and the edge annotation data are available for display to a user device. That is, as for the distribution tree described supra, the width and patterns and, optionally color (not shown) for display of the edges between nodes of a geo-coded map are optionally coded to represent the proposed coverage amounts—with the width depicting the relative size of the risk placements through the intermediaries and with the responding parties. Additionally, the width and patterns and, optionally color (not shown) for display of the edges are coded to represent proposal and market coverage statuses of the risk placements through brokers and with the markets. Edges displayed as long dashes such as those shown between MDCO 764 and broker MOS 735 denote that the proposal status is pending. Edges displayed as very short dashed edges, such as those between broker SPCL 724 and broker ALL 725, denote that the proposal status and the market coverage status are "not applicable" (N/A). The displayed long and short dashed edges between brokers and the respective markets, for example those between MOS 735 and ABC 734, represent pending market coverage. The displayed solid edges between insurers and reinsurers, for example the edge between SAIN 766 and ASFR 769, denote bound market contracts. This graphical geo-coded map representation of buyers, brokers and markets makes it possible to readily view the physical locations for brokers being considered for inclusion in a particular risk placement. In one example, placement of earthquake coverage can be confirmed to be at a geographic location separate from the location being insured, to ensure responsiveness to claims in the event of an earthquake.

The data model tracks risk placement parameters that specify amounts of risk ceded by at least some of first tier responding parties to second tier responding parties; and the data model tracks status of the risk placements in the first tier and in the second tier. Node and edge data are generated for display on a map that depicts multiple risk placements on behalf of at least one requesting party through intermediaries to responding parties. In a first tier, a requestor geographic designation of the requesting party is depicted as a requesting party node on the map. At least two intermediaries are depicted as intermediary nodes on the map. The requesting party node is graphically connected by edges with the intermediary nodes; at least two responding parties are depicted as responding party nodes on the map; and the intermediary nodes are graphically connected by edges with the responding parties' nodes to depict relationships between the intermediaries and respective responding parties who communicate through the intermediaries.

In some use cases, the requestor's geographic designation identifies a corporate office location without designating a risk location. For other use cases, the requestor's geographic designation designates a risk location to which the risk placements apply.

The overall approach described for the proportional treaty distribution of risk can be applied in a variety of circumstances.

Use Case #2: Insurance and Facultative Reinsurance Placements

After the devastation caused by the oil disaster in the Gulf of Mexico, Better Petroleum needs to acquire insurance valued at USD 3,000,000,000 per occurrence—to insure against accidents that may cause extensive environmental damage. This coverage will need to be negotiated via a separate reinsurance contract, under which the reinsured agrees to offer and the reinsurer agrees to accept this particular risk, which, at least as an example, may be too large to be included under a treaty.

For this facultative reinsurance use case, some or all of the underlying risk is ceded to the reinsurer(s) by means of a separate negotiated contract, as opposed to one that is ceded under a reinsurance treaty. That is, the facultative reinsurance requires a separate contract. Due to the corporation's large capacity needs, the broker reasonably concludes that the risk to be placed (RTBP) cannot (and should not) be assumed by a single insurance carrier, and will therefore require placement of multiple, stacked coverage layers, and will also possibly require placement of multiple shares within one or more of the stacked coverage layers. These multiple placements will diversify the risk transfer.

Figure 8:
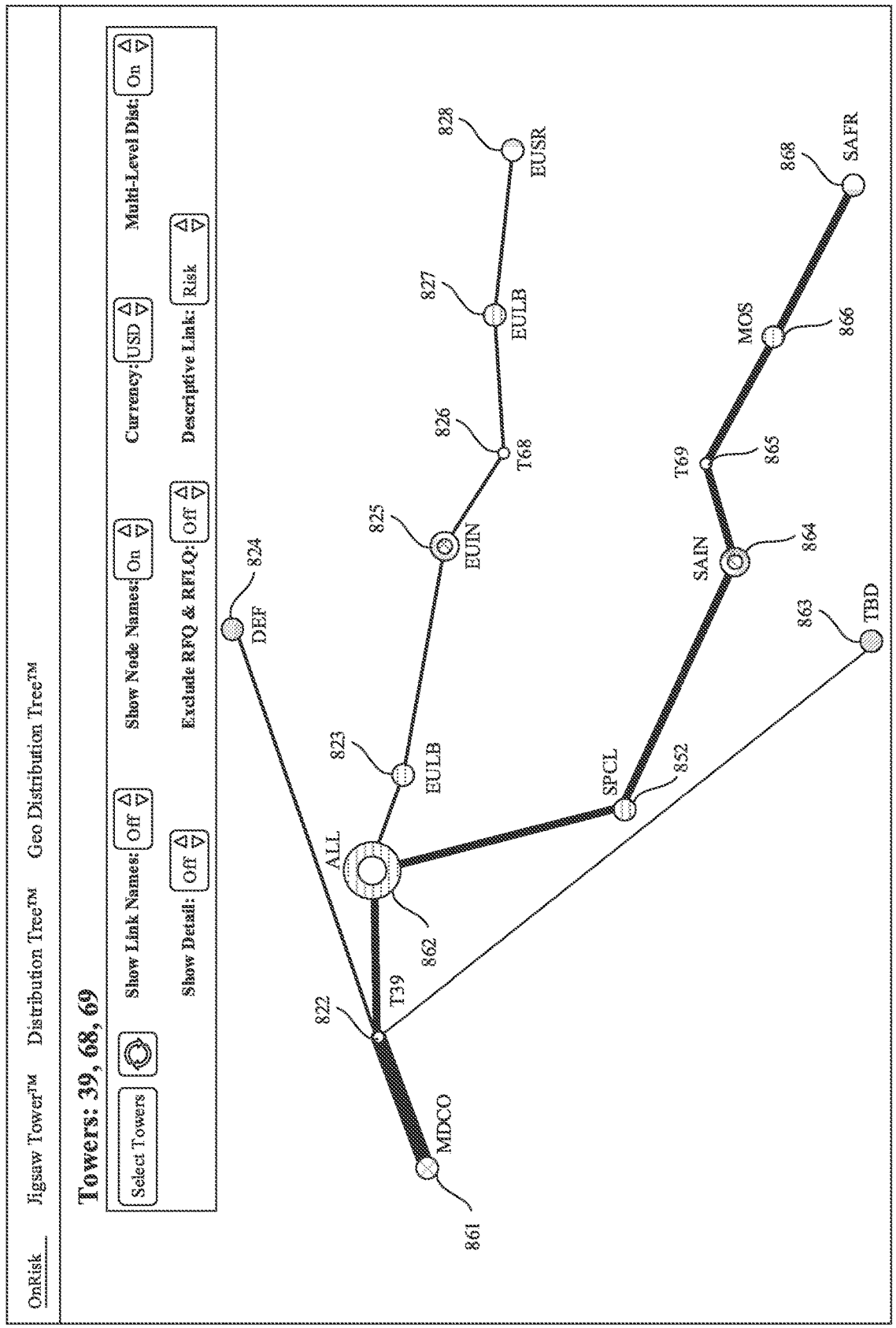
FIG. 8 shows a distribution tree example for placement of facultative reinsurance, without status coding of the placement. One of the markets, DEF, is either not reinsured or has not disclosed its reinsurance. One node, TBD, represents a request for quote (RFQ).

In one example, FIG. 8 illustrates a distribution tree example with a facultative reinsurance placement, without status coding of the placement, covering the insurance needs of corporation MDCO 861. It displays quotes and market contracts of Tower 39 822, Tower 68 826 and Tower 69 865, with markets DEF, Inc. (DEF) 824, EUIN 825, SAIN 864, EUSR 828, and SAFR 868. The technology disclosed optionally displays requests for quote (RFQ) and requests for lead quotes (RFLQ) as nodes; in this example, FIG. 8 also displays an RFQ, TBD 863. Responding parties EUIN 825 and SAIN 864 in the first tier are treated as requesting parties for the ceded risk in the second tier. Brokers ALL 862, EULB 823, 827, SPCL 852 and MOS 866 are represented by nodes-with-horizontal-fill. AllLines Brokerage, Inc. displayed as ALL 862, uses a different icon to signify the broker operating the system, to aid the system operator to locate its proposed placements. Reinsurers EUSR 828 and SAFR 868 are markets providing reinsurance.

Figure 9:
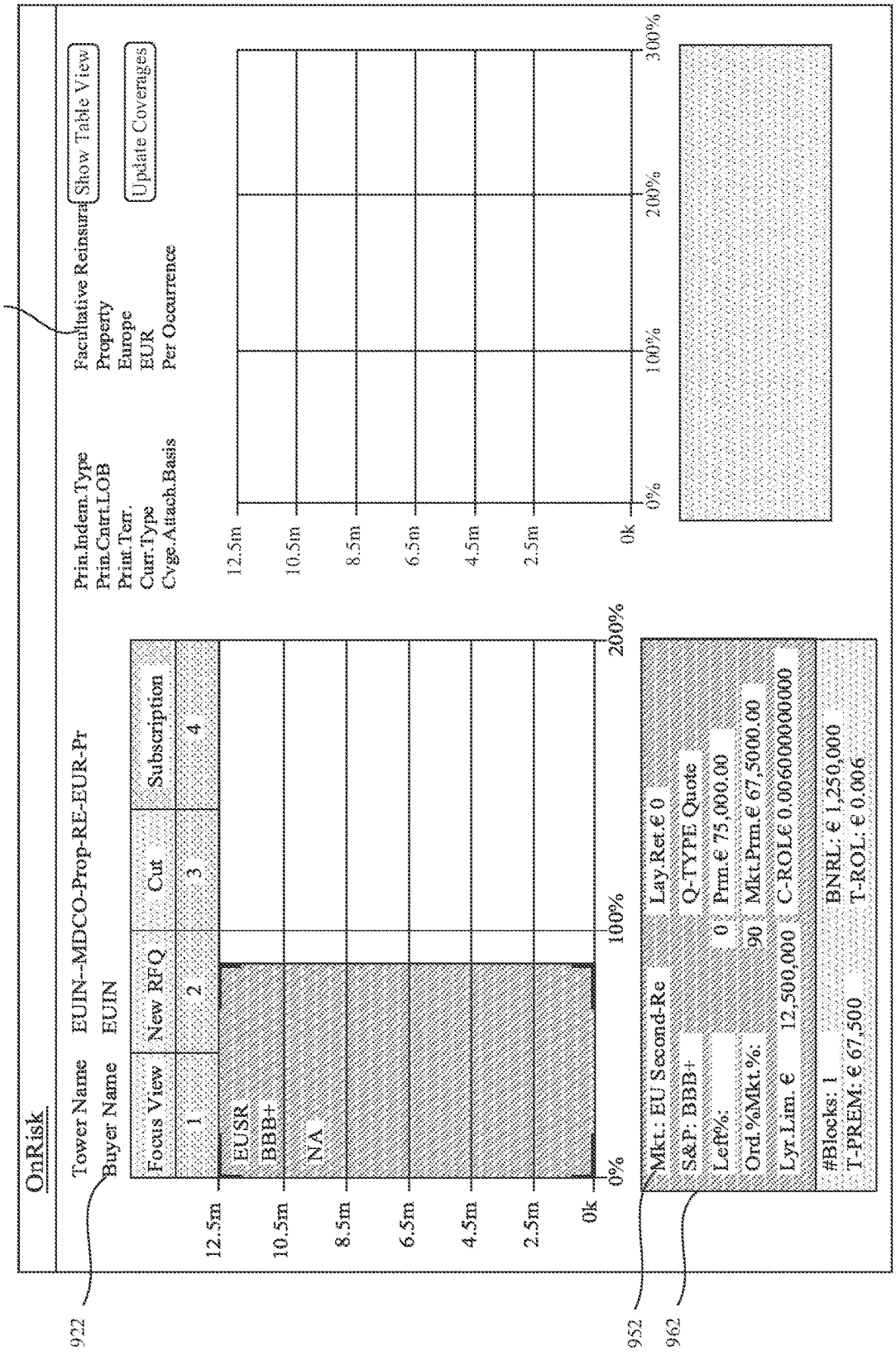
FIG. 9 shows an example tower for a 90 percent facultative reinsurance of EUIN by EUSR.

FIG. 9 shows example tower for a 90 percent facultative reinsurance 926 of EUIN 922 by EUSR 952. This facultative reinsurance example shows a tower representation for requesting party/buyer EUIN 825, 922, with a coverage proposal provided by reinsurer EUSR 828, 952. Object information table 962 displays coverage specifics for the EUSR proposal, including the proposal type (also referred to as "Q-TYPE") as "quote," values for premium and market premium, etc.

The distribution tree and geo-coded map visualization tools disclosed enable users to more quickly comprehend the channels and status of a complex placement. Automatically calculated and updated representations of complex data, calculated and assembled from tables, are more readily understood than the underlying tables. Automated analysis and production of up-to-date visualizations allows a less experienced person to understand a placement more efficiently, more effectively, and with more opportunities for user interaction than would be possible if such person followed the conventional practice of studying tables and reaching conclusions from tables of data.

Computer System

FIG. 10 is a block diagram of an example computer system 1000. FIG. 10 is a block diagram of an example computer system, according to one implementation. The processor can be an ASIC or RISC processor. It can be an FPGA or other logic or gate array. It can include graphic processing unit (GPU) resources. Computer system 1010 typically includes at least one processor 1072 that communicates with a number of peripheral devices via bus subsystem 1050. These peripheral devices may include a storage subsystem 1026 including, for example, memory devices and a file storage subsystem, user interface input devices 1038, user interface output devices 1078, and a network interface subsystem 1076. The input and output devices allow user interaction with computer system 1010. Network interface subsystem 1076 provides an interface to outside networks, including an interface to corresponding interface devices in other computer systems.

User interface input devices 1038 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1010.

User interface output devices 1078 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include all possible types of devices and ways to output information from computer system 1010 to the user or to another machine or computer system.

Storage subsystem 1026 stores programming and data constructs that provide the functionality of some or all of the modules and methods described herein. These software modules are generally executed by processor 1072 alone or in combination with other processors.

Memory subsystem 1022 used in the storage subsystem can include a number of memories including a main random access memory (RAM) 1034 for storage of instructions and data during program execution and a read only memory (ROM) 1032 in which fixed instructions are stored. A file storage subsystem 1036 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1036 in the storage subsystem 1026, or in other machines accessible by the processor.

In some implementations, network(s) can be any one or any combination of Local Area Network (LAN), Wide Area Network (WAN), WiMAX, Wi-Fi, telephone network, wireless network, point-to-point network, star network, token ring network, hub network, mesh network, peer-to-peer connections like Bluetooth, Near Field Communication (NFC), Z-Wave, ZigBee, or other appropriate configuration of data networks, including the Internet.

Bus subsystem 1050 provides a mechanism for letting the various components and subsystems of computer system 1010 communicate with each other as intended. Although bus subsystem 1050 is shown schematically as a single bus, alternative implementations of the bus subsystem may use multiple busses.

Computer system 1010 can be of varying types including a workstation, server, computing cluster, blade server, server farm, or any other data processing system or computing device. Due to the ever-changing nature of computers and networks, the description of computer system 1010 depicted in FIG. 10 is intended only as one example. Many other configurations of computer system 1010 are possible having more or fewer components than the computer system depicted in FIG. 10.

Particular Implementations

Some particular implementations and features are described in the following discussion.

One implementation of the disclosed technology includes a method of graphically displaying distribution through placement channels for multiple placements, including representing multiple risk placements in a recursive data model of one or more requesting parties, multiple intermediaries, and multiple responding parties in a first tier, with one or more of the responding parties that assume risk being recursively treated as requesting parties in one or more subsequent tiers. The method also includes the data model tracking risk placement parameters that specify amounts of risk being placed with responding parties and, recursively, reflecting ceding of risk from at least some of the responding parties to subsequent tier responding parties. The method further includes the data model tracking status of the risk placements in the first tier; generating node and edge data for display that depicts multiple risk placements on behalf of at least one requesting party through intermediaries to responding parties, wherein, in a first tier: the requesting party is depicted as a requesting party node in a first region; at least two intermediaries are depicted as intermediary nodes in a second region adjoining the first region; the requesting party node is graphically connected by edges with the intermediary nodes; at least two responding parties are depicted as responding party nodes in a third region adjoining the second region and spaced apart from the first region; and the intermediary nodes are graphically connected by edges with the responding party nodes to depict relationships between the intermediaries and respective responding parties who communicate through the intermediaries. The method further includes generating edge annotation data for display, wherein the edge annotation data codes line width of the edges to depict relative size of the risk placements through the intermediaries and with the responding parties; and codes the edges to depict statuses of the risk placements through the intermediaries and with the responding parties. The method yet further includes transmitting the node and edge data for display and the edge annotation data for display to a user device.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified.

At least the first, second and third regions are arranged in columns. The method can also include representing status of the risk placements by distinct annotations to edges coded to include statuses pending, accepted, expired, and not-taken-up. Also, the statuses pending, accepted, expired, and not-taken-up can be applied to the edges connecting the requesting parties to the intermediaries.

The method can include representing status of the risk placements by distinct annotations to edges coded to include statuses pending, not-taken-up, authorized, and bound. Also, the statuses pending, not-taken-up, authorized, and bound can be applied to the edges connecting the intermediaries to the responding parties.

In some implementations, the method can further include representing urgency of events in the risk placements by distinct annotations to edges coded to indicate approach of a deadline within a predetermined time. For some implementations of the method at least one of the responding parties in a second tier reinsures a responding party in the first tier and a reinsurance relationship is depicted by one or more edges connecting the first tier responding party to the second tier responding party reinsurer. The disclosed method can further include responding to user input requesting display of line width coding but not risk placement status coding by suppressing display of the risk placement status coding, and the method can also include responding to user input requesting display of risk placement status coding but not by line width coding by suppressing display of the line width coding.

One implementation includes a stack structure node between the requesting party and at least one intermediary, in which a stack data structure corresponding to the stack structure node tracks data regarding responding parties and their position among the multiple risk placements, the stack structure node is depicted in the first or the second region, and the stack structure node is connected by edges to at least one requesting party and to one or more intermediaries.

The disclosed technology can include node data for display which further includes active links that, when selected, cause generation of a drill down display that provides additional data for the selected node. For some implementations the disclosed method can include, upon addition of an added node to the data model of requesting parties, intermediaries, and responding parties, causing rearrangement of positions of the nodes in the data for display without a user input specifying a location in the display where the added node should appear.

For other implementations the method can further include alphabetizing names of the intermediaries so that the intermediary nodes appear in an alphabetical order in the second region. The method can further include alphabetizing names of the responding parties so that the responding party nodes appear in an alphabetical order in the third region.

In one implementation, the disclosed method includes depicting second and subsequent tier nodes in fourth and subsequent regions outside the regions one, two and three. For some implementations, the edge annotation data for display further includes coding edges in the first tier to indicate status of handling at least one claim settlement between the requesting parties and the responding parties; and further includes suppressing display of placement status data when the data for display depicts claim settlement status.

The disclosed technology can include suppressing display of second and subsequent tier nodes when the data for display depicts claim settlement status. For some implementations, the method can further include representing in the data for display multiple lines of risk placement for multiple types of insurance for a single requesting party.

One implementation of the disclosed technology includes a method of further including two or more stack structure nodes between the requesting party and at least one intermediary; wherein a stack data structure corresponding to a particular stack structure node stores data regarding responding parties for one type of insurance and coverage provided by the responding parties in the multiple risk placements; multiple stack data structures and stack structure nodes correspond to the multiple lines of risk placement for multiple types of insurance; the stack data nodes are depicted in the first or the second region; and each of the stack data nodes is connected by edges to at least one requesting party and to one or more intermediaries.

For some implementations of the disclosed method there are at least two requesting parties in the first tier. Additionally, for some implementations, there are at least two intermediaries in the first tier.

One implementation includes a method of graphically displaying distribution through placement channels for multiple placements, the method including representing multiple risk placements in a multi-tiered data model of one or more requesting parties, multiple intermediaries, and multiple responding parties in a first tier, with one or more of the responding parties that assume risk being treated, in a second tier, as requesting parties for a ceded risk, wherein the data model tracks risk placement parameters that specify amounts of risk ceded by at least some of responding parties to second tier responding parties; and the data model tracks status of the risk placements in the first tier. The method also includes generating node and edge data for display that depicts multiple risk placements on behalf of at least one requesting party through intermediaries to responding parties, wherein, in a first tier the requesting party is depicted as a requesting party node in a first region; at least two intermediaries are depicted as intermediary nodes in a second region adjoining the first region; the requesting party node is graphically connected by edges with the intermediary nodes; at least two responding parties are depicted as responding party nodes in a third region adjoining the second region and spaced apart from the first region; and the intermediary nodes are graphically connected by edges with the responding party nodes to depict relationships between the intermediaries and respective responding parties who communicate through the intermediaries. The method further includes generating edge annotation data for display, wherein the edge annotation data codes line width of the edges to depict relative size of the risk placements through the intermediaries and with the responding parties, and codes the edges to depict statuses of the risk placements through the intermediaries and with the responding parties. Yet further, the method includes transmitting the node and edge data for display and the edge annotation data for display to a user device.

One implementation includes a method of graphically displaying geographic redistribution of risk through placement channels for multiple placements to geographically designated responding parties. The method includes representing multiple risk placements in a multi-tiered data model of one or more requesting parties, multiple intermediaries, and multiple responding parties in a first tier, with one or more of the responding parties that assume risk being treated, in a second tier, as requesting parties for a ceded risk, wherein the requesting parties, the multiple intermediaries, and the multiple responding parties are geographically designated for their respective locations on a map; the data model tracks risk placement parameters that specify amounts of risk ceded by at least some of responding parties to second tier responding parties; and the data model tracks status of the risk placements in the first tier. The method also includes generating node and edge data for display on a map that depicts multiple risk placements on behalf of at least one requesting party through intermediaries to responding parties, wherein, in a first tier a requestor geographic designation of the requesting party is depicted as a requesting party node on the map; at least two intermediaries are depicted as intermediary nodes on the map; the requesting party node is graphically connected by edges with the intermediary nodes; at least two responding parties are depicted as responding party nodes on the map; and the intermediary nodes are graphically connected by edges with the responding party nodes to depict relationships between the intermediaries and respective responding parties who communicate through the intermediaries. The method further includes generating edge annotation data for display, wherein the edge annotation data codes line width of the edges to depict relative size of the risk placements through the intermediaries and with the responding parties; and codes the edges to depict statuses of the risk placements through the intermediaries and with the responding parties. Yet further, the method includes transmitting the node and edge data for display and the edge annotation data for display to a user device.

For some implementations of the disclosed method the requestor geographic designation identifies a corporate offices location without designating a risk location. For some implementations of the disclosed method the requestor geographic designation designates a risk location to which the risk placements apply.

In one implementation of the disclosed technology, a tangible computer readable storage medium stores program instructions that implement actions for graphically displaying distribution through placement channels for multiple placements. The implementation includes representing multiple risk placements in a multi-tiered data model of one or more requesting parties, multiple intermediaries, and multiple responding parties in a first tier, with one or more of the responding parties that assume risk being treated, in a second tier, as requesting parties for a ceded risk. For the implementation, the data model tracks risk placement parameters that specify amounts of risk ceded by at least some of responding parties to second tier responding parties; and the data model tracks status of the risk placements in the first tier; generates node and edge data for display that depicts multiple risk placements on behalf of at least one requesting party through intermediaries to responding parties, wherein, in both first and second tiers the requesting party is depicted as a requesting party node in a first region. Further, for the implementation, at least two intermediaries are depicted as intermediary nodes in a second region adjoining the first region; the requesting party node is graphically connected by edges with the intermediary nodes; the intermediary nodes are graphically connected by edges with the responding party nodes to depict relationships between the intermediaries and respective responding parties who communicate through the intermediaries; and at least one responding party from the first tier shown in the third region is also shown as a requesting party from the second tier in the first region. Also, the disclosed implementation includes generating edge annotation data for display, wherein the edge annotation data codes line width of the edges to depict relative size of the risk placements through the intermediaries and with the responding parties; and codes the edges to depict statuses of the risk placements through the intermediaries and with the responding parties; and transmitting the node and edge data for display and the edge annotation data for display to a user device.

Some implementations of the disclosed technology include, upon addition of an added node to the data model of requesting parties, intermediaries, and responding parties, causing rearrangement of positions of the nodes in the data for display without a user input specifying a location in the display where the added node should appear. Some implementations further include representing in the data for display multiple lines of risk placement for multiple types of insurance for a single requesting party. Some implementations also include two or more stack structure nodes between the requesting party and at least one intermediary; wherein a stack data structure corresponding to a particular stack structure node stores data regarding responding parties for one type of insurance and coverage provided by the responding parties in the multiple risk placements; multiple stack data structures and stack structure nodes correspond to the multiple lines of risk placement for multiple types of insurance; the stack data nodes are depicted in the first or the second region; and each of the stack data nodes is connected by edges to at least one requesting party and to one or more intermediaries.

Other implementations may include tangible computer-readable memory including computer program instructions that cause a computer to implement any of the methods described above. Yet another implementation may include a system including memory and one or more processors operable to execute instructions, stored in the memory, to perform any of the methods described above.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A non-transitory computer readable storage medium that stores program instructions that, when executed on hardware, implement actions for graphically displaying distribution through placement channels of multiple placements, the implementation including:
  representing multiple risk placements in a multi-tiered data model of one or more requesting parties, multiple intermediaries, and multiple responding parties in a first tier, with one or more of the responding parties that assume risk being treated, in a second tier, as requesting parties for a ceded risk, wherein:
    the data model tracks risk placement parameters that specify amounts of risk ceded by at least some of responding parties to second tier responding parties; and
    the data model tracks status of the risk placements in the first tier;
  generating node and edge data for display that depicts multiple risk placements on behalf of at least one requesting party through intermediaries to responding parties, wherein, in a first tier:
    the requesting party is depicted as a requesting party node in a first region;
    at least two intermediaries are depicted as intermediary nodes in a second region adjoining the first region;
    the requesting party node is graphically connected by edges with the intermediary nodes;
    at least two responding parties are depicted as responding party nodes in a third region adjoining the second region and spaced apart from the first region; and
    the intermediary nodes are graphically connected by edges with the responding party nodes to depict relationships between the intermediaries and respective responding parties who communicate through the intermediaries;

further generating edge annotation data for display, wherein the edge annotation:
calculates magnitudes or pricing of the risk placements and scales line width of the edges through the intermediaries and with the responding parties based on calculated magnitudes or pricing; and
codes the edges to depict statuses of the risk placements through the intermediaries and with the responding parties; and
transmitting the node and edge data and the edge annotation data for display to a user device.

2. The non-transitory computer readable storage medium of claim 1, wherein at least one of the responding parties in a second tier reinsures a responding party in the first tier and a reinsurance relationship is depicted by one or more edges connecting the first tier responding party to the second tier responding party reinsurer.

3. The non-transitory computer readable storage medium of claim 1, further including responding to user input requesting display of line width coding, but not risk placement status coding, by suppressing display of the risk placement status coding.

4. The non-transitory computer readable storage medium of claim 1, further including responding to user input requesting display of risk placement status coding, but not by line width coding, by suppressing display of the line width coding.

5. The non-transitory computer readable storage medium of claim 1, further including, upon addition of an added node to the data model of requesting parties, intermediaries, and responding parties, causing rearrangement of positions of the nodes in the data for display without a user input specifying a location in the display where the added node should appear.

6. The non-transitory computer readable storage medium of claim 1, further including representing in the data for display multiple lines of risk placement for multiple types of insurance for a single requesting party.

7. The non-transitory computer readable storage medium of claim 1, further including two or more stack structure nodes between the requesting party and at least one intermediary;
wherein:
a stack data structure corresponding to a particular stack structure node stores data regarding responding parties for one type of insurance and coverage provided by the responding parties in the multiple risk placements;
multiple stack data structures and stack structure nodes correspond to the multiple lines of risk placement for multiple types of insurance;
the stack data nodes are depicted in the first or the second region; and
each of the stack data nodes is connected by edges to at least one requesting party and to one or more intermediaries.

8. The non-transitory computer readable storage medium of claim 1, wherein there are at least two requesting parties in the first tier.

9. A computer-implemented method of graphically displaying distribution through placement channels for multiple placements, the method including:
representing using a computer processor multiple risk placements in a recursive data model of one or more requesting parties, multiple intermediaries, and multiple responding parties in a first tier, with one or more of the responding parties that assume risk being recursively treated as requesting parties in one or more subsequent tiers, wherein:
the data model tracks risk placement parameters that specify amounts of risk being placed with responding parties and, recursively, reflect ceding of risk from at least some of the responding parties to subsequent tier responding parties; and
the data model tracks status of the risk placements in the first tier;
generating by the computer processor node and edge data for display that depicts multiple risk placements on behalf of at least one requesting party through intermediaries to responding parties, wherein, in a first tier:
the requesting party is depicted as a requesting party node in a first region;
at least two intermediaries are depicted as intermediary nodes in a second region adjoining the first region;
the requesting party node is graphically connected by edges with the intermediary nodes;
at least two responding parties are depicted as responding party nodes in a third region adjoining the second region and spaced apart from the first region; and
the intermediary nodes are graphically connected by edges with the responding party nodes to depict relationships between the intermediaries and respective responding parties who communicate through the intermediaries;
further generating by the computer processor edge annotation data for display, wherein the edge annotation data:
codes line width of the edges to depict relative size of the risk placements through the intermediaries and with the responding parties; and
codes the edges to depict statuses of the risk placements through the intermediaries and with the responding parties; and
transmitting from the computer processor the node and edge data for display and the edge annotation data for display to a user device.

10. The method of claim 9, further including representing status of the risk placements by distinct annotations to edges coded to include statuses pending, accepted, expired, and not-taken-up.

11. The method of claim 9, further including a stack structure node between the requesting party and at least one intermediary,
wherein
a stack data structure corresponding to the stack structure node tracks data regarding responding parties and their position among the multiple risk placements,
the stack structure node is depicted in the first or the second region, and
the stack structure node is connected by edges to at least one requesting party and to one or more intermediaries.

12. The method of claim 9, further including depicting second and subsequent tier nodes in fourth and subsequent regions outside the first, second and third regions.

13. The method of claim 9, wherein there are at least two intermediaries in the first tier.

14. A computer-implemented method of graphically displaying geographic redistribution of risk through placement channels for multiple placements to geographically designated responding parties, the method including:
representing multiple risk placements in a multi-tiered data model of one or more requesting parties, multiple intermediaries, and multiple responding parties in a first tier, with one or more of the responding parties that assume risk being treated, in a second tier, as requesting parties for a ceded risk, wherein:

the requesting parties, the multiple intermediaries, and the multiple responding parties are geographically designated for their respective locations on a map;

the data model tracks risk placement parameters that specify amounts of risk ceded by at least some of responding parties to second tier responding parties; and the data model tracks status of the risk placements in the first tier;

generating by a computer processor geo-coded node and edge data for display on a graphic user interface of a map that depicts multiple risk placements on behalf of at least one requesting party through intermediaries to responding parties, wherein, in a first tier:

a requestor geographic designation of the requesting party is depicted as a geo-coded requesting party node on the map;

at least two intermediaries are depicted as geo-coded intermediary nodes on the map;

the requesting party node is graphically connected by edges with the intermediary nodes;

at least two responding parties are depicted as geo-coded responding party nodes on the map; and the intermediary nodes are graphically connected by edges with the responding party nodes to depict relationships between the intermediaries and respective responding parties who communicate through the intermediaries;

further generating by the computer processor edge annotation data for display, wherein the edge annotation data:

codes line width of the edges to depict relative size of the risk placements through the intermediaries and with the responding parties; and codes the edges to depict statuses of the risk placements through the intermediaries and with the responding parties; and transmitting from the computer processor the node and edge data for display and the edge annotation data for display to a user device.

15. The method of claim 14, wherein the requestor geographic designation identifies a corporate offices location without designating a risk location.

16. The method of claim 14, wherein the requestor geographic designation designates a risk location to which the risk placements apply.

17. A computer-implemented method for interactively exploring on a GUI generated using a processor, progress of a complex risk placement comprising multiple placements through placement channels, the method including:

accessing a table that represents the multiple risk placements in a recursive data model of one or more requesting parties, multiple intermediaries, and multiple responding parties in a first tier, with one or more of the responding parties that assume risk being recursively treated as requesting parties in one or more subsequent tiers, wherein:

the data model tracks risk placement parameters that specify amounts of risk being placed with responding parties and, recursively, reflect ceding of risk from at least some of the responding parties to subsequent tier responding parties; and the data model tracks status of the risk placements in the first tier;

generating node and edge data for display that depicts multiple risk placements on behalf of at least one requesting party through intermediaries to responding parties, wherein, in a first tier:

the requesting party is depicted as a requesting party node in a first region;

at least two intermediaries are depicted as intermediary nodes in a second region adjoining the first region;

the requesting party node is graphically connected by edges with the intermediary nodes;

at least two responding parties are depicted as responding party nodes in a third region adjoining the second region and spaced apart from the first region; and the intermediary nodes are graphically connected by edges with the responding party nodes to depict relationships between the intermediaries and respective responding parties who communicate through the intermediaries;

further generating edge annotation data for display, wherein the edge annotation data:

codes line width of the edges to depict relative size of the risk placements through the intermediaries and with the responding parties; and codes the edges to depict statuses of the risk placements through the intermediaries and with the responding parties; and further generating active controls for the nodes or edges, wherein selection of an active link generates a drill-down message;

transmitting a first data page for display on a user device, including the node and edge data, the edge annotation data, and the active links;

receiving a first drill-down message indicating user selection of at least one of the active links for a first node or edge; and causing display of drill-down data from the table, accompanying the first display, wherein the drill-down data elaborates on status of the first node or edge.

18. The method of claim 17, further including responding to user input requesting display of line width coding, but not risk placement status coding, by suppressing display of the risk placement status coding.

19. The method of claim 17, further including responding to user input requesting display of risk placement status coding, but not by line width coding, by suppressing display of the line width coding.

20. The method of claim 17, further including, upon addition of an added node to the data model of requesting parties, intermediaries, and responding parties, causing rearrangement of positions of the nodes in the data for display without a user input specifying a location in the display where the added node should appear.

21. A device that includes at least one processor, memory coupled to the processor, and program instructions stored in the memory to implement actions of graphically displaying distribution through placement channels for multiple placements, including:

representing multiple risk placements in a recursive data model of one or more requesting parties, multiple intermediaries, and multiple responding parties in a first tier, with one or more of the responding parties that assume risk being recursively treated as requesting parties in one or more subsequent tiers, wherein:

the data model tracks risk placement parameters that specify amounts of risk being placed with responding parties and, recursively, reflect ceding of risk from at least some of the responding parties to subsequent tier responding parties; and the data model tracks status of the risk placements in the first tier;

generating node and edge data for display that depicts multiple risk placements on behalf of at least one requesting party through intermediaries to responding parties, wherein, in a first tier:
- the requesting party is depicted as a requesting party node in a first region;
- at least two intermediaries are depicted as intermediary nodes in a second region adjoining the first region;
- the requesting party node is graphically connected by edges with the intermediary nodes;
- at least two responding parties are depicted as responding party nodes in a third region adjoining the second region and spaced apart from the first region; and
- the intermediary nodes are graphically connected by edges with the responding party nodes to depict relationships between the intermediaries and respective responding parties who communicate through the intermediaries;

further generating edge annotation data for display, wherein the edge annotation data:
- codes line width of the edges to depict relative size of the risk placements through the intermediaries and with the responding parties; and
- codes the edges to depict statuses of the risk placements through the intermediaries and with the responding parties; and transmitting from the processor the node and edge data for display and the edge annotation data for display to a user device.

22. A device that includes at least one processor, memory coupled to the processor, and program instructions stored in the memory to implement actions of graphically displaying geographic redistribution of risk through placement channels for multiple placements to geographically designated responding parties, including:

representing multiple risk placements in a multi-tiered data model of one or more requesting parties, multiple intermediaries, and multiple responding parties in a first tier, with one or more of the responding parties that assume risk being treated, in a second tier, as requesting parties for a ceded risk, wherein:
- the requesting parties, the multiple intermediaries, and the multiple responding parties are geographically designated for their respective locations on a map;
- the data model tracks risk placement parameters that specify amounts of risk ceded by at least some of responding parties to second tier responding parties; and
- the data model tracks status of the risk placements in the first tier;

generating geo-coded node and edge data for display on a map that depicts multiple risk placements on behalf of at least one requesting party through intermediaries to responding parties, wherein, in a first tier:
- a requestor geographic designation of the requesting party is depicted as a geo-coded requesting party node on the map;
- at least two intermediaries are depicted as geo-coded intermediary nodes on the map;
- the requesting party node is graphically connected by edges with the intermediary nodes;
- at least two responding parties are depicted as geo-coded responding party nodes on the map; and
- the intermediary nodes are graphically connected by edges with the responding party nodes to depict relationships between the intermediaries and respective responding parties who communicate through the intermediaries;

further generating by the computer processor edge annotation data for display, wherein the edge annotation data:
- codes line width of the edges to depict relative size of the risk placements through the intermediaries and with the responding parties; and
- codes the edges to depict statuses of the risk placements through the intermediaries and with the responding parties; and transmitting from the processor the node and edge data for display and the edge annotation data for display to a user device.

* * * * *